(12) United States Patent
He et al.

(10) Patent No.: US 11,379,687 B2
(45) Date of Patent: Jul. 5, 2022

(54) METHOD FOR EXTRACTING FEATURE STRING, DEVICE, NETWORK APPARATUS, AND STORAGE MEDIUM

(71) Applicants: NSFOCUS TECHNOLOGIES GROUP CO., LTD., Beijing (CN); NSFOCUS TECHNOLOGIES, INC., Beijing (CN)

(72) Inventors: Dongjing He, Beijing (CN); Hongliang Zhao, Beijing (CN); Jiaxi Ren, Beijing (CN)

(73) Assignees: NSFOCUS TECHNOLOGIES GROUP CO., LTD., Beijing (CN); NSFOCUS TECHNOLOGIES, INC., Beijing (CN)

( * ) Notice: Subject to any disclaimer, the term of this patent is extended or adjusted under 35 U.S.C. 154(b) by 265 days.

(21) Appl. No.: 16/958,486

(22) PCT Filed: Dec. 24, 2018

(86) PCT No.: PCT/CN2018/123233
§ 371 (c)(1),
(2) Date: Jun. 26, 2020

(87) PCT Pub. No.: WO2019/128938
PCT Pub. Date: Jul. 4, 2019

(65) Prior Publication Data
US 2020/0349388 A1 Nov. 5, 2020

(30) Foreign Application Priority Data

Dec. 29, 2017 (CN) .......................... 201711480389.4

(51) Int. Cl.
*G06F 40/279* (2020.01)
*G06F 17/18* (2006.01)
(Continued)

(52) U.S. Cl.
CPC .......... *G06K 9/6232* (2013.01); *G06F 17/18* (2013.01); *G06F 40/279* (2020.01); *G06K 9/629* (2013.01);
(Continued)

(58) Field of Classification Search
None
See application file for complete search history.

(56) References Cited

U.S. PATENT DOCUMENTS

2008/0288631 A1* 11/2008 Faisal ..................... G06F 8/656
709/224
2016/0328366 A1 11/2016 Elarian et al.
(Continued)

FOREIGN PATENT DOCUMENTS

| CN | 1447264 A | 10/2003 |
|---|---|---|
| CN | 102270212 A | 12/2011 |

(Continued)

OTHER PUBLICATIONS

International Search Report and Written Opinion issued by the International Searching Authority (ISA/CN in PCT Application No. PCT/CN2018/123233 dated Mar. 15, 2019. 11 pages, including English translation of International Search Report.

*Primary Examiner* — Ariel Mercado
(74) *Attorney, Agent, or Firm* — Meunier Carlin & Curfman LLC

(57) ABSTRACT

Disclosed are a method for extracting a feature string, a device, a network apparatus, and a storage medium. The method comprises: determining, for each candidate feature string, a transition probability for each pair of adjacent characters in the candidate feature string according to a first-order Markov transition probability matrix; determining a transition entropy value of the candidate feature string according to the transition probability of each pair of adjacent characters and the logarithm of the transition probabil-
(Continued)

ity; and labeling a candidate feature string having a transition entropy value greater than a pre-determined threshold as a first usable feature string, and using a valid first usable feature string as an extracted target feature string.

20 Claims, 6 Drawing Sheets

(51) Int. Cl.
*G06K 9/62* (2022.01)
*H04L 67/02* (2022.01)
*G06V 10/75* (2022.01)

(52) U.S. Cl.
CPC ......... *G06K 9/6256* (2013.01); *G06V 10/757* (2022.01); *H04L 67/02* (2013.01)

(56) References Cited

U.S. PATENT DOCUMENTS

2018/0088939 A1* 3/2018 Strachan .................. G06F 8/20
2019/0384913 A1* 12/2019 Usui ....................... G06F 21/54

FOREIGN PATENT DOCUMENTS

| CN | 102938764 A | 2/2013 |
| CN | 103377199 A | 10/2013 |
| CN | 104168272 A | 11/2014 |
| CN | 104767736 A | 7/2015 |
| CN | 105430021 A | 3/2016 |
| CN | 105554152 A | 5/2016 |
| CN | 107070852 A | 8/2017 |
| CN | 107438052 A | 12/2017 |
| CN | 108234347 A | 6/2018 |
| JP | 2010186412 A | 8/2010 |

* cited by examiner

S501

Taking any first session as a second target session, taking each remaining first session as each fifth session, identifying the feature string to be discarded, labeled to be the feature string to be discarded having the largest transition entropy, in the second target session, and labeling the feature string to be discarded having the largest transition entropy as the first usable feature string; and taking the second target session adjusted through the feature string and each fifth session as each sixth session

S502

For each second session, acquiring each feature string in the data packet of the second session, taking the first usable feature string in the sixth session in corresponding match with the feature string as the fifth usable feature string, according to each fifth usable feature string, determining each fifth field information corresponding to the second session, judging whether each fifth field information of the second session is correspondingly the same as the first field information contained in any sixth session, if so, blocking the second session; counting the fifth quantity of the blocked second sessions, and the blocked fifth data traffic; judging whether the first quantity is the same as the fifth quantity, and whether the first data traffic is the same as the fifth data traffic; if not, determining the fifth usable feature string of the second target session adjusted through the feature string to be valid; if so, determining the fifth usable feature string of the second target session adjusted through the feature string to be invalid

Fig. 5

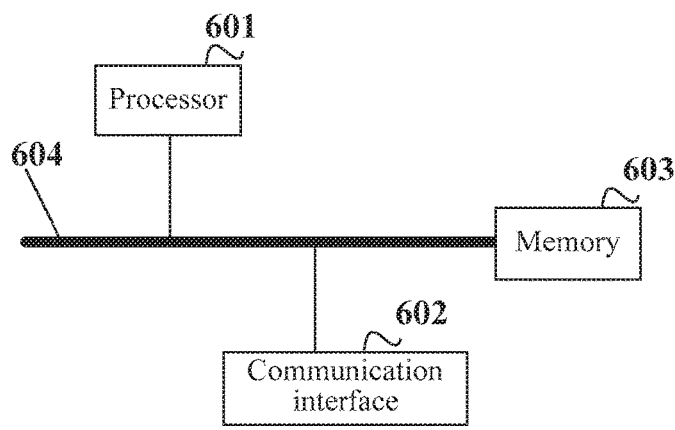

Fig. 6

METHOD FOR EXTRACTING FEATURE STRING, DEVICE, NETWORK APPARATUS, AND STORAGE MEDIUM

CROSS-REFERENCE TO RELATED APPLICATIONS

The present application is a National Stage of International Application No. PCT/CN2018/123233, filed Dec. 24, 2018, which claims priority to Chinese patent application No. 201711480389.4, filed with Chinese Patent Office on Dec. 29, 2017, and entitled "Method for Extracting Feature String, Device, Network Apparatus, and Storage Medium", the contents of which are incorporated by reference herein in its entirety.

FIELD

The present invention relates to the field of application identification, in particular to a method and device for extracting a feature string, a network apparatus, and a storage medium.

BACKGROUND

In the application identification technology, traffic of different applications in the network traffic needs to be identified and distinguished through extracting a feature string, so as to realize such functions as traffic control on different applications. In recent years, rapid development of the internet leads to a dramatic increase in the quantity and variety of applications, and fierce competition also greatly shortens the updating cycle of applications. The well-known applications may be updated at an average frequency of 1-3 weeks per version, the relatively well-known applications may be updated at an average frequency of 1-3 months per version, and as to niche applications which are not well known, their average updating frequency may not exceed 6 months per version. The updating of applications is usually accompanied by a change of the feature string in a data packet in the application traffic, which results in partial or complete invalidation of the existing feature string used for application identification. When traditional analysis techniques and methods are adopted, protocol analysts are required to pay more attentions and maintain more frequently the feature string used for application identification. In order to be adapted to rapid updating of applications, a solution which can automatically extract a feature string is in urgent need.

However, in the related art, the following methods for extracting a feature string are available: 1. A manual data packet analysis method: application traffic is triggered and captured manually, to extract a feature string in a data packet. This method has the problems that a large amount of time needs to be spent on session filtration, analysis and feature extraction, and in the process of extracting a feature string, manual intervention is required all the time, then the feature string can be extracted. 2. A semi-automatic scripting and manual data packet analysis method: session filtration and extraction of a feature string of a data packet through matching of repeated feature strings are finished by scripts, while triggering of application traffic and final screening of the feature string of a data packet are finished manually. This method also needs manual intervention to realize extraction of the feature string. 3. Application disassembling analysis and manual data packet analysis method: a feature string is extracted through manual reverse analysis of application traffic, and this method needs a lot of manpower and materials resources, and the whole process also needs manual intervention to extract the feature string.

Therefore, when a feature string is extracted in the related art, a lot of manpower and material resources need to be invested. At present, no solution which can automatically extract a feature string is available.

SUMMARY

Embodiments of the present invention provide a method for extracting a feature string, a device, a network apparatus and a storage medium, to solve the problem that a feature string cannot be extracted automatically in the related art.

Embodiments of the present invention provide a method for extracting a feature string, and the method includes:

A1, according to each first five-tuple information corresponding to an application, counting each first session corresponding to the each first five-tuple information; for the each first session, determining data packets having feature strings to be extracted in the first session, and determining participles of the data packets; and taking each determined participle as each candidate feature string;

B1, determining a first-order Markov transition probability matrix containing a transition probability of each two adjacent characters according to an existing rule base and a current genetic variation coefficient;

C1, for the each candidate feature string, determining a transition probability of each two adjacent characters in the candidate feature string according to the first-order Markov transition probability matrix; and determining a transition entropy of the candidate feature string according to the transition probability of each two adjacent characters and a logarithm of the transition probability;

D1, for the each candidate feature string, judging whether the transition entropy of the candidate feature string is greater than a preset threshold, when the transition entropy of the candidate feature string is not greater than the preset threshold, labeling the candidate feature string as a feature string to be discarded, when the transition entropy of the candidate feature string is greater than the preset threshold, labeling the candidate feature string as a first usable feature string; and E1, judging whether at least one first usable feature string exists as a valid feature string, when the at least one first usable feature string exists as the valid feature string, taking the valid feature string as a target feature string extracted from the data packets; when the at least one first usable feature string does not exist as the valid feature string, resetting the genetic variation coefficient, and performing B1.

Further, the determining the transition entropy of the candidate feature string according to the transition probability of each two adjacent characters and the logarithm of the transition probability includes: calculating the product of the transition probability of each two adjacent characters and the logarithm of the transition probability, summing each obtained product, and determining a negative number of the obtained sum to be the transition entropy of the candidate feature string.

Further, the for the each first session, determining the data packets having feature strings to be extracted in the first session includes: for the each first session, acquiring a preset quantity of data packets in the first session in a preset data packet transmission direction, and taking the preset quantity of data packets as the data packets having feature strings to be extracted in the first session.

Further, the for the data packets having feature strings to be extracted, determining the participles of the data packets includes: for the data packets having feature strings to be extracted, judging whether the data packets are hyper text transfer protocol (HTTP) data packets; when the data packets are the HTTP data packets, determining the participles of the data packets according to a predefined regular expression; when the data packets are not the HTTP data packets, determining the participles of the data packets according to an N-Gram language model.

Further, the determining the first-order Markov transition probability matrix containing the transition probability of each two adjacent characters according to the existing rule base and the current genetic variation coefficient includes: reading an existing rule base, for each two adjacent characters in the existing rule base, counting a quantity of occurrence of the two adjacent characters, and counting a quantity of occurrence of a previous character in the two adjacent characters among the characters, except a last character, in the existing rule base, and determining the transition probability of the two adjacent characters according to a ratio of the quantity of occurrence of the two adjacent characters to the quantity of occurrence of the previous character in the two adjacent characters; and determining the first-order Markov transition probability matrix containing the transition probability of each two adjacent characters according to the transition probability of the two adjacent characters and the current genetic variation coefficient.

Further, before labeling the candidate feature string as the first usable feature string, the method further includes: recombining in sequence characters contained in the candidate feature string from front to back, to constitute multiple sub-candidate feature strings; for each sub-candidate feature string, determining the transition probability of two adjacent characters in the sub-candidate feature string according to the first-order Markov transition probability matrix, and determining an entropy wave value of the sub-candidate feature string according to the transition probability of a character group constituted by each two adjacent characters in the sub-candidate feature string, the logarithm of the transition probability, and a quantity of character groups contained in the sub-candidate feature string and for the candidate feature string, identifying a target sub-candidate feature string having a largest entropy wave value in the candidate feature string, determining a redundancy of the candidate feature string according to a ratio of an entropy wave value of the target sub-candidate feature string to the transition entropy of the candidate feature string; judging whether the redundancy of the candidate feature string is greater than a preset redundancy threshold, when the redundancy of the candidate feature string is not greater than the preset redundancy threshold, keeping the candidate character string unchanged; when the redundancy of the candidate feature string is greater than the preset redundancy threshold, updating the candidate feature string by adopting the target sub-candidate feature string.

Further, the determining the entropy wave value of the sub-candidate feature string according to the transition probability of the character group constituted by each two adjacent characters in the sub-candidate feature string, the logarithm of the transition probability, and the quantity of character groups contained in the sub-candidate feature string includes: calculating the product of the transition probability of the character group constituted by each two adjacent characters in the sub-candidate feature string and the logarithm of the transition probability, summing each obtained product, and determining a ratio of the obtained sum to the quantity of character groups contained in the sub-candidate feature string, and taking a negative number of the ratio as the entropy wave value of the sub-candidate feature string.

Further, the judging whether at least one first usable feature string exists as the valid feature string includes: for the each first session, determining each first field information corresponding to each first usable feature string of the first session; counting each second session corresponding to each second five-tuple information according to each second five-tuple information corresponding to the application; for the each second session, acquiring each feature string in data packets of the second session, and taking the first usable feature string in the first session in corresponding match with the feature string as a second usable feature string, according to each second usable feature string, determining each second field information corresponding to the second session, and judging whether each second field information of the second session is correspondingly the same as the first field information contained in any first session, when the each second field information of the second session is correspondingly the same as the first field information contained in any first session, blocking the second session; and counting a first quantity of blocked second sessions, and a total second quantity of second sessions transmitted by the application; and judging whether the first quantity is the same as the second quantity, when the first quantity is the same as the second quantity, judging each first usable feature string to be the valid feature string.

Further, when the second quantity is determined to be greater than the first quantity, the method further includes: counting a blocked first data traffic and a total second data traffic transmitted by the application; and judging whether a ratio of the first data traffic to the second data traffic is greater than a preset first threshold; and/or judging whether a ratio of the first quantity to the second quantity is greater than a preset second threshold; when the ratio of the first data traffic to the second data traffic is greater than the preset first threshold and/or the ratio of the first quantity to the second quantity is greater than the preset second threshold, judging each first usable feature string to be the valid feature string.

Further, when the ratio of the first data traffic to the second data traffic is not greater than the preset first threshold; or when the ratio of the first quantity to the second quantity is not greater than the preset second threshold, the method further includes: taking the each first session as a first target session in sequence, and taking each remaining first session as each third session, to perform the following operations:

A2, for the each second session, acquiring each feature string in the data packets of the second session, taking the first usable feature string in the third session in corresponding match with the feature string as a third usable feature string, according to each third usable feature string, determining each third field information corresponding to the second session, and judging whether the each third field information of the second session is correspondingly the same as the first field information contained in any third session, when the each third field information of the second session is correspondingly the same as the first field information contained in any third session, blocking the second session;

B2, counting a third quantity of blocked second sessions, and a blocked third data traffic;

C2, judging whether the first quantity is the same as the third quantity, and whether the first data traffic is the same as the third data traffic; when the first quantity is different from the third quantity and/or the first data traffic is different from the third data traffic, determining each first usable feature string of the first target session to be valid; when the first quantity is the same as the third quantity, and the first data traffic is the same as the third data traffic, determining each first usable feature string of the first target session to be invalid, and performing D2;

D2, identifying a first usable feature string having a smallest transition entropy in the first target session, and labeling the first usable feature string having the smallest transition entropy as a feature string to be discarded; and taking the first target session adjusted through the feature string and each third session as each fourth session; and E2, for each second session, acquiring each feature string in the data packets of the second session, taking the first usable feature string in the fourth session in corresponding match with the feature string as a fourth usable feature string, according to each fourth usable feature string, determining each fourth field information corresponding to the second session, and judging whether the each fourth field information of the second session is correspondingly the same as the first field information contained in any fourth session, when the each fourth field information of the second session is correspondingly the same as the first field information contained in any fourth session, blocking the second session; counting a fourth quantity of blocked second sessions, and a blocked fourth data traffic; judging whether the first quantity is the same as the fourth quantity, and whether the first data traffic is the same as the fourth data traffic; when the first quantity is different from the fourth quantity, and/or the first data traffic is different from the fourth data traffic, determining the first usable feature string of the first target session adjusted through the feature string to be valid; when the first quantity is the same as the fourth quantity, and the first data traffic is the same as the fourth data traffic, determining the first usable feature string of the first target session adjusted through the feature string to be invalid, and performing D2.

Further, when the second quantity is determined to be smaller than the first quantity, the method further includes:

A3, taking any first session as a second target session, taking each remaining first session as each fifth session, identifying a feature string to be discarded, labeled to be the feature string to be discarded having a largest transition entropy, in the second target session, and labeling the feature string to be discarded having the largest transition entropy as the first usable feature string; and taking the second target session adjusted through the feature string and each fifth session as each sixth session; and B3, for the each second session, acquiring each feature string in the data packet of the second session, taking the first usable feature string in the sixth session in corresponding match with the feature string as the fifth usable feature string, according to each fifth usable feature string, determining each fifth field information corresponding to the second session, judging whether the each fifth field information of the second session is correspondingly the same as the first field information contained in any sixth session, when the each fifth field information of the second session is correspondingly the same as the first field information contained in any sixth session, blocking the second session; counting a fifth quantity of blocked second sessions, and a blocked fifth data traffic; judging whether the first quantity is the same as the fifth quantity, and whether the first data traffic is the same as the fifth data traffic; when the first quantity is different from the fifth quantity, and/or the first data traffic is different from the fifth data traffic, determining the fifth usable feature string of the second target session adjusted through the feature string to be valid; when the first quantity is the same as the fifth quantity, and the first data traffic is the same as the fifth data traffic, determining the fifth usable feature string of the second target session adjusted through the feature string to be invalid, and performing A3.

Further, after taking the valid feature string as the target feature string extracted from the data packets, the method further includes: saving the target feature string in an existing rule base.

On the other hand, embodiments of the present invention provide a device for extracting a feature string, and the device includes:

a first determining module, configured to count each first session corresponding to each first five-tuple information according to the each first five-tuple information corresponding to an application, for the each first session, determine data packets having feature strings to be extracted in the first session, and determine participles of the data packets, and take each determined participle as each candidate feature string;

a second determining module, configured to determine a first-order Markov transition probability matrix containing a transition probability of each two adjacent characters according to an existing rule base and a current genetic variation coefficient;

a third determining module, configured to: for the each candidate feature string, determine a transition probability of each two adjacent characters in the candidate feature string according to the first-order Markov transition probability matrix; and determine a transition entropy of the candidate feature string according to the transition probability of each two adjacent characters and a logarithm of the transition probability;

a labeling module, configured to, for the each candidate feature string, judge whether the transition entropy of the candidate feature string is greater than a preset threshold, when the transition entropy of the candidate feature string is not greater than the preset threshold, label the candidate feature string as a feature string to be discarded, when the transition entropy of the candidate feature string is greater than the preset threshold, label the candidate feature string as a first usable feature string; and a fourth determining module, configured to judge whether at least one first usable feature string exists as a valid feature string, when the at least one first usable feature string exists as the valid feature string, take the valid feature string as a target feature string extracted from the data packet; when the at least one first usable feature string does not exist as the valid feature string, reset the genetic variation coefficient, and trigger the second determining module.

Further, the third determining module is specifically configured to calculate the product of the transition probability of each two adjacent characters and the logarithm of the transition probability, sum each obtained product, and determine a negative number of the obtained sum to be the transition entropy of the candidate feature string.

Further, the first determining module is specifically configured to, for the each first session, acquire a preset quantity of data packets in the first session in a preset data packet transmission direction, and take the preset quantity of data packets as the data packets having feature strings to be extracted in the first session.

Further, the first determining module is specifically configured to, for the data packets having feature strings to be extracted, judge whether the data packets are hyper text transfer protocol (HTTP) data packets; when the data packets are the HTTP data packets, determine the participles of the data packets according to a predefined regular expression, when the data packets are not the HTTP data packets, determine the participles of the data packets according to an N-Gram language model.

Further, the second determining module is specifically configured to: read an existing rule base, for each two adjacent characters in the existing rule base, count a quantity of occurrence of the two adjacent characters, and count a quantity of occurrence of a previous character in the two adjacent characters among the characters, except a last character, in the existing rule base, and determine the transition probability of the two adjacent characters according to a ratio of the quantity of occurrence of the two adjacent characters to the quantity of occurrence of the previous character in the two adjacent characters; and determine the first-order Markov transition probability matrix containing the transition probability of each two adjacent characters according to the transition probability of the two adjacent characters and the current genetic variation coefficient.

Further, the device further includes: an updating module, configured to recombine in sequence characters contained in the candidate feature string from front to back, to constitute multiple sub-candidate feature strings; for each sub-candidate feature string, determine the transition probability of each two adjacent characters in the sub-candidate feature string according to the first-order Markov transition probability matrix, and determine an entropy wave value of the sub-candidate feature string according to the transition probability of a character group constituted by each two adjacent characters in the sub-candidate feature string, the logarithm of the transition probability, and a quantity of character groups contained in the sub-candidate feature string; for the candidate feature string, identify a target sub-candidate feature string having a largest entropy wave value in the candidate feature string, determine a redundancy of the candidate feature string according to a ratio of an entropy wave value of the target sub-candidate feature string to the transition entropy of the candidate feature string; judge whether the redundancy of the candidate feature string is greater than a preset redundancy threshold, when the redundancy of the candidate feature string is not greater than the preset redundancy threshold, keep the candidate character string unchanged; when the redundancy of the candidate feature string is greater than the preset redundancy threshold, update the candidate feature string by adopting the target sub-candidate feature string.

Further, the updating module is specifically configured to calculate the product of the transition probability of the character group constituted by each two adjacent characters in the sub-candidate feature string and the logarithm of the transition probability, sum each obtained product, determine a ratio of the obtained sum to the quantity of character groups contained in the sub-candidate feature string, and take a negative number of the ratio as the entropy wave value of the sub-candidate feature string.

Further, the fourth determining module is specifically configured to, for the each first session, determine each first field information corresponding to each first usable feature string of the first session, count each second session corresponding to each second five-tuple information according to each second five-tuple information corresponding to the application; for the each second session, acquire each feature string in data packets of the second session, take the first usable feature string in the first session in corresponding match with the feature string as a second usable feature string, according to each second usable feature string, determine each second field information corresponding to the second session, and judge whether each second field information of the second session is correspondingly the same as the first field information contained in any first session, when the each second field information of the second session is correspondingly the same as the first field information contained in any first session, block the second session; and count a first quantity of blocked second sessions, and a total second quantity of second sessions transmitted by the application; and judge whether the first quantity is the same as the second quantity, when the first quantity is the same as the second quantity, judge each first usable feature string to be the valid feature string.

Further, the fourth determining module is further configured to count a blocked first data traffic and a total second data traffic transmitted by the application; judge whether a ratio of the first data traffic to the second data traffic is greater than a preset first threshold; and/or judge whether a ratio of the first quantity to the second quantity is greater than a preset second threshold; when the ratio of the first data traffic to the second data traffic is greater than the preset first threshold and/or the radio of the first quantity to the second quantity is greater than the preset second threshold, judge each first usable feature string to be the valid feature string.

Further, the fourth determining module includes:

a blocking unit, configured to take the each first session as a first target session in sequence, and take each remaining first session as each third session, for the each second session, acquire each feature string in the data packets of the second session, take the first usable feature string in the third session in corresponding match with the feature string as a third usable feature string, according to each third usable feature string, determine each third field information corresponding to the second session, and judge whether the each third field information of the second session is correspondingly the same as the first field information contained in any third session, when the each third field information of the second session is correspondingly the same as the first field information contained in any third session, block the second session;

a counting unit, configured to count a third quantity of blocked second sessions, and blocked third data traffic;

a first determining unit, configured to judge whether the first quantity is the same as the third quantity, and whether the first data traffic is the same as the third data traffic; when the first quantity is different from the third quantity and/or the first data traffic is different from the third data traffic, determine each first usable feature string of the first target session to be valid; when the first quantity is the same as the third quantity, and the first data traffic is the same as the third data traffic, determine each first usable feature string of the first target session to be invalid, and trigger the first identification unit;

a first identification unit, configured to identify a first usable feature string having a smallest transition entropy in the first target session, and label the first usable feature string having the smallest transition entropy as a feature string to be discarded; and take the first target session adjusted through the feature string and each third session as each fourth session; and a second determining unit, configured to: for each second session, acquire each feature string in the data packets of the second session, take the first usable feature string in the fourth session in corresponding match with the feature string as a fourth usable feature string, according to each fourth usable feature string, determine each fourth field information corresponding to the second session, and judge whether the each fourth field information of the second session is correspondingly the same as the first field information contained in any fourth session, when the each fourth field information of the second session is correspondingly the same as the first field information contained in any fourth session, block the second session; count a fourth quantity of blocked second sessions, and a blocked fourth data traffic; judge whether the first quantity is the same as the fourth quantity, and whether the first data traffic is the same as the fourth data traffic; when the first quantity is different from the fourth quantity, and/or the first data traffic is different from the fourth data traffic, determine the first usable feature string of the first target session adjusted through the feature string to be valid; when the first quantity is the same as the fourth quantity, and the first data traffic is the same as the fourth data traffic, determine the first usable feature string of the first target session adjusted through the feature string to be invalid, and trigger the first identification unit.

Further, the fourth determining module further includes:

a second identification unit, configured to take any first session as a second target session, take each remaining first session as each fifth session, identify a feature string to be discarded, labeled to be the feature string to be discarded having a largest transition entropy, in the second target session, and label the feature string to be discarded having the largest transition entropy as the first usable feature string; and take the second target session adjusted through the feature string and each fifth session as each sixth session; and a third determining unit, configured to: for the each second session, acquire each feature string in the data packets of the second session, take the first usable feature string in the sixth session in corresponding match with the feature string as the fifth usable feature string, according to each fifth usable feature string, determine each fifth field information corresponding to the second session, judge whether the each fifth field information of the second session is correspondingly the same as the first field information contained in any sixth session, when the each fifth field information of the second session is correspondingly the same as the first field information contained in any sixth session, block the second session; count a fifth quantity of blocked second sessions, and a blocked fifth data traffic; judge whether the first quantity is the same as the fifth quantity, and whether the first data traffic is the same as the fifth data traffic; when the first quantity is different from the fifth quantity, and/or the first data traffic is different from the fifth data traffic, determine the fifth usable feature string of the second target session adjusted through the feature string to be valid; when the first quantity is the same as the fifth quantity, and the first data traffic is the same as the fifth data traffic, determine the fifth usable feature string of the second target session adjusted through the feature string to be invalid, and trigger the second identification unit.

Further, the device further includes: a saving module, configured to save the target feature string in an existing rule base.

The present invention provides a network apparatus, including a processor, a communication interface, a memory, and a communication bus, where the processor, the communication interface and the memory communicate with each other through the communication bus; the memory, configured to store computer programs; and the processor, configured to implement the method steps in any of the above items when the computer programs stored on the memory are executed.

The present invention provides a computer readable storage medium, where the computer readable storage medium is internally provided with computer programs, and the computer programs implement the method steps in any of above items when the computer programs are executed by the processor.

Embodiments of the present invention provide a method for extracting a feature string, a device, a network apparatus and a storage medium. The method includes: A1, according to each first five-tuple information corresponding to an application, counting each first session corresponding to the each first five-tuple information; for the each first session, determining data packets having feature strings to be extracted in the first session, and determining participles of the data packets; and taking each determined participle as each candidate feature string; B1, determining a first-order Markov transition probability matrix containing a transition probability of each two adjacent characters according to an existing rule base and a current genetic variation coefficient; C1, for the each candidate feature string, determining a transition probability of each two adjacent characters in the candidate feature string according to the first-order Markov transition probability matrix; and determining a transition entropy of the candidate feature string according to the transition probability of each two adjacent characters and a logarithm of the transition probability; D1, for the each candidate feature string, judging whether the transition entropy of the candidate feature string is greater than a preset threshold, when the transition entropy of the candidate feature string is not greater than the preset threshold, labeling the candidate feature string as a feature string to be discarded, when the transition entropy of the candidate feature string is greater than the preset threshold, labeling the candidate feature string as a first usable feature string; and E1, judging whether at least one first usable feature string exists as a valid feature string, when the at least one first usable feature string exists as the valid feature string, taking the valid feature string as a target feature string extracted from the data packet; when the at least one first usable feature string does not exist as the valid feature string, resetting the genetic variation coefficient, and performing B1.

Since in the embodiments of the present invention, after each candidate feature string is determined, the transition entropy of the candidate feature string is determined according to the first-order Markov transition probability matrix containing a transition probability of each two adjacent characters, the candidate feature string having a transition entropy meeting a requirement is taken as a first usable feature string, and the valid first usable feature string is taken as an extracted target feature string. When a valid feature string does not exist, the genetic variation coefficient is reset, the first-order Markov transition probability matrix is redetermined according to the reset genetic variation coefficient, and then the target feature string is extracted. The method for extracting a feature string provided in the embodiments of the present invention does not require manual intervention, and achieves fully automatic extraction of a feature string.

BRIEF DESCRIPTION OF THE DRAWINGS

In order to more clearly illustrate technical solutions in embodiments of the present invention, a brief introduction will be given below on accompanying drawings which need to be used in the description of the embodiments. Apparently, the accompanying drawings described below are merely some embodiments of the present invention. Those skilled in the art can obtain other accompanying drawings according to these drawings without any creative effort.

FIG. 5 is a schematic diagram of a process for extracting a feature string provided in Embodiment 10 of the present invention.

FIG. 6 is a structural schematic diagram of a network apparatus provided in an embodiment of the present invention.

DETAILED DESCRIPTION OF THE EMBODIMENTS

The present invention will be described in detail below in combination with accompanying drawings. Apparently, the described embodiments are merely part, but not all, of the embodiments of the present invention. All the other embodiments obtained by those skilled in the art without any creative effort based on the embodiments in the present invention shall all fall within the protection scope of the present invention.

Embodiment 1

Figure 1:
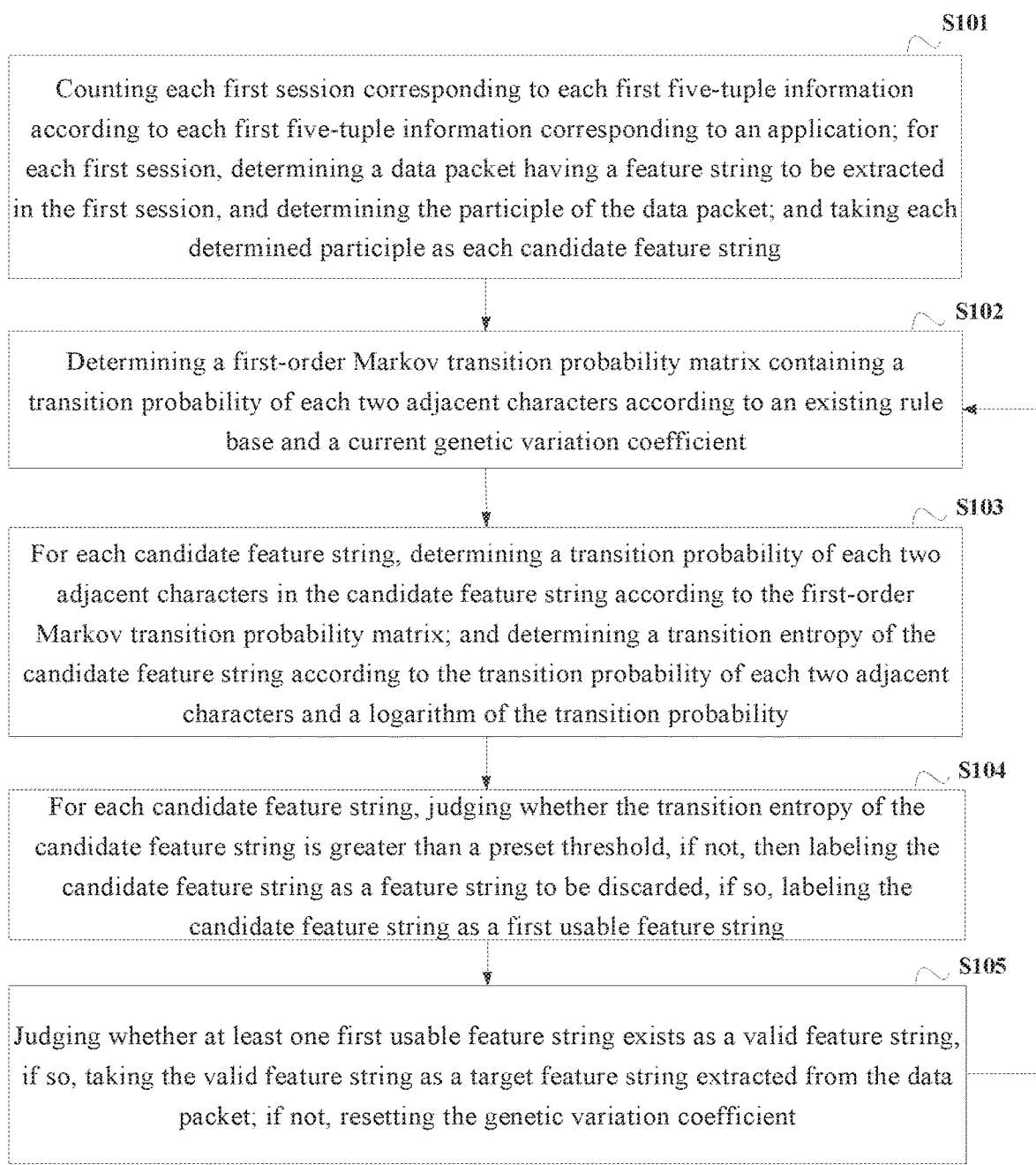
FIG. 1 is a schematic diagram of a process for extracting a feature string provided in Embodiment 1 of the present invention.

FIG. 1 is schematic diagram of a process for extracting a feature string provided in an embodiment of the present invention, and the process includes the following operations.

S101: according to each first five-tuple information corresponding to an application, counting each first session corresponding to the each first five-tuple information; for the each first session, determining data packets having feature strings to be extracted in the first session, and determining participles of the data packets; and taking each determined participle as each candidate feature string.

The method for extracting a feature string provided in the embodiments of the present invention is applied to a network apparatus. The network apparatus may be a network security apparatus, a traffic monitoring apparatus, etc.

After an application is triggered by a client, the application will transmit the session; and the client may acquire each first five-tuple information corresponding to the application, and send each first five-tuple information to a network apparatus. The network apparatus receives each first five-tuple information sent by the client, and counts each first session corresponding to each first five-tuple information according to each first five-tuple information. The process in which a client acquires each first five-tuple information corresponding to the application and sends each first five-tuple information to a network apparatus belongs to the related art, and the process will not be repeated redundantly herein.

For example, the first five-tuple information is 192.168.1.1, 10000, TCP, 121.14.88.76, 80. The network apparatus counts session transmission, and takes the session, with the five-tuple information being 192.168.1.1, 10000, TCP, 121.14.88.76, 80, in the session transmission process as a first session. Of course, the first five-tuple information may be one and may also be multiple, and only one five-tuple information is illustrated herein as an example.

After each first session is determined, for each first session, data packets having feature strings to be extracted in the first session may be determined. Where, all the data packets in the first session may be taken as the data packets having feature strings to be extracted; and a preset quantity of data packets in the first session may also be taken as the data packets having feature strings to be extracted. After the data packets having feature strings to be extracted is acquired, the participles in the data packets can be determined. Where, the participles in the data packets may be determined according to an existing language model, for example, the participles in the data packets may be determined according to an N-Gram language model. After the participles are determined, each participle may be taken as each candidate feature string.

S102: determining a first-order Markov transition probability matrix containing a transition probability of each two adjacent characters according to an existing rule base and a current genetic variation coefficient.

The network apparatus saves the existing rule base, and the rule base contains each character. For each two adjacent characters, the network apparatus may count the number of occurrence of the two adjacent characters in the rule base, and the total number of occurrence of characters in the rule base. The total number of occurrence of characters is the sum of the number of occurrence of any two adjacent characters in the existing rule base. A transition probability of the two adjacent characters may be determined according to the number of occurrence of the two adjacent characters, the total number of occurrence of characters and the current genetic variation coefficient. Specifically, the ratio of the number of occurrence of the two adjacent characters to the total number of occurrence of the characters is taken as an initial transition probability of the two adjacent characters, and the product of the initial transition probability of the two adjacent characters and the current genetic variation coefficient is taken as the transition probability of the two adjacent characters.

Or, for each two adjacent characters, the network apparatus can count the number of occurrence of the two adjacent characters in the rule base, and the number of occurrence of the previous character in the two adjacent characters in the rule base. A transition probability of the two adjacent characters is determined according to the number of occurrence of the two adjacent characters, the number of occurrence of the previous character in the two adjacent characters, and the current genetic variation coefficient. Specifically, the ratio of the number of occurrence of the two adjacent characters to the number of occurrence of the previous character in the two adjacent characters is taken as the initial transition probability of the two adjacent characters, and the product of the initial transition probability of the two adjacent characters and the current genetic variation coefficient is taken as the transition probability of the two adjacent characters.

In this way, the network apparatus may determine the transition probability of each two adjacent characters, and further may determine the first-order Markov transition probability matrix containing a transition probability of each two adjacent characters according to the transition probability of each two adjacent characters.

S103: for the each candidate feature string, determining a transition probability of each two adjacent characters in the candidate feature string according to the first-order Markov transition probability matrix; and determining a transition entropy of the candidate feature string according to the transition probability of each two adjacent characters and a logarithm of the transition probability.

For each determined candidate feature string, the network apparatus can identify each two adjacent characters in the candidate feature string, can determine the transition probability of each two adjacent characters in the candidate feature string according to the first-order Markov transition probability matrix, and can further calculate a logarithm of the transition probability of each two adjacent characters, and can determine the transition entropy of the candidate feature string according to the transition probability of each two adjacent characters in the candidate feature string and the logarithm of the transition probability.

For example, the transition entropy of the candidate feature string can be determined according to the product of the transition probability of each two adjacent characters and the logarithm of the transition probability; or the transition entropy of the candidate feature string can also be determined according to the ratio of the transition probability of each two adjacent characters to the logarithm of the transition probability.

S104: for the each candidate feature string, judging whether the transition entropy of the candidate feature string is greater than a preset threshold, when the transition entropy of the candidate feature string is not greater than the preset threshold, labeling the candidate feature string as a feature string to be discarded, when the transition entropy of the candidate feature string is greater than the preset threshold, labeling the candidate feature string as a first usable feature string.

The network apparatus saves a preset threshold. After the transition entropy of the candidate feature string is determined for each candidate feature string, whether the transition entropy of the candidate feature string is greater than the preset threshold is judged. If the transition entropy of the candidate feature string is not greater than the preset threshold, then the candidate feature string is labeled as a feature string to be discarded, and if the transition entropy of the candidate feature string is greater than the preset threshold, then the candidate feature string is labeled as a first usable feature string. Moreover, after the candidate feature string is labeled as a feature string to be discarded or a first usable feature string, the labeled information of each feature string and the transition entropy information of each feature string are saved.

S105: judging whether at least one first usable feature string exists as a valid feature string, when the at least one first usable feature string exists as the valid feature string, taking the valid feature string as a target feature string extracted from the data packets; when the at least one first usable feature string does not exist as the valid feature string, resetting the genetic variation coefficient, and performing S102.

After labeling each first usable feature string, the network apparatus judges whether at least one first usable feature string exists as a valid feature string in each first usable feature string. Where, the network apparatus can save in advance a valid feature string library, after each first usable feature string is labeled, for each first usable feature string, whether the first usable feature string is saved in the valid feature string library is judged, if the first usable feature string is saved in the valid feature string library, then the first usable feature string is determined to be a valid feature string, if the first usable feature string is not saved in the valid feature string library, the first usable feature string is determined not to be a valid feature string.

The network apparatus judges whether at least one first usable feature string exists as a valid feature string, if so, then the first usable feature string of the valid feature string is taken as a target feature string extracted from a data packet. When the valid feature string does not exist, it indicates that the extracted first usable feature strings are all invalid. At this time, the genetic variation coefficient needs to be reset, and then the first-order Markov transition probability matrix containing a transition probability of each two adjacent characters is redetermined according to the existing rule base and the reset genetic variation coefficient. Generally, the initial genetic variation coefficient is 1, and the reset genetic variation coefficient may be 0.9, 0.95, 1.05, 1.1, etc.

The first-order Markov transition probability matrix is redetermined according to the existing rule base and the reset genetic variation coefficient, and the transition entropy of each candidate feature string is determined according to the redetermined first-order Markov transition probability matrix, and further the feature string having a transition entropy greater than a preset threshold is labeled as a first usable feature string, and the feature string having a transition entropy not greater than a preset threshold is labeled as a feature string to be discarded. When at least one first usable feature string is taken as a valid feature string in the first usable feature string, the first usable feature string which is a valid feature string is taken as a target feature string extracted from a data packet, otherwise, the genetic variation coefficient is reset continuously, and the extraction process of the feature string is performed.

Since in the embodiments of the present invention, after each candidate feature string is determined, the transition entropy of the candidate feature string is determined according to the first-order Markov transition probability matrix containing a transition probability of each two adjacent characters, the candidate feature string having a transition entropy meeting a requirement is taken as a first usable feature string, and the valid first usable feature string is taken as an extracted target feature string. When no valid feature string exists, the genetic variation coefficient is reset, the first-order Markov transition probability matrix is redetermined according to the reset genetic variation coefficient, and then the target feature string is extracted. The method for extracting a feature string provided in the embodiments of the present invention does not require manual intervention, achieves fully automatic extraction of a feature string, and saves a lot of manpower and material resources.

As to a method for extracting a feature string in the related art, once an application is updated, a feature string needs to be extracted again for the updated application, while the original feature string is generally invalid, this is because the method for extracting a feature string in the related art is poor in adapting to the updated application, that is, the generalization ability is poor. While in the embodiments of the present invention, since the genetic variation coefficient and first-order Markov transition probability matrix are introduced, therefore, the change of the feature string can be detected to a certain extent and a corresponding feature string can be extracted. This ability can be passed on to updated application versions and will not attenuate, therefore, a strong generalization ability is possessed.

Moreover, the method for extracting a feature string provided in the embodiments of the present invention can achieve fully automatic extraction of a feature string, and does not need manual intervention, thereby avoiding influence of subjective factors of protocol analysts during feature string extraction, and enabling extraction of a feature string to be more accurate.

Embodiment 2

In order that the transition entropy of the candidate feature string is determined more accurately, on the basis of the above embodiments, in the embodiments of the present invention, the operation of determining the transition entropy of the candidate feature string according to the transition probability of each two adjacent characters and the logarithm of the transition probability includes: calculating the product of the transition probability of each two adjacent characters and the logarithm of the transition probability, summing each obtained product, and determining a negative number of the obtained sum to be the transition entropy of the candidate feature string.

After determining the transition probability of each two adjacent characters in the candidate feature string, the network apparatus can calculate the logarithm of the transition probability of each two adjacent characters, then calculate the product of the transition probability of each two adjacent characters and the logarithm of the transition probability, sum each obtained product, and determine the negative number of the obtained sum to be the transition entropy of the candidate feature string.

Specifically, for each candidate feature string, each two adjacent characters in the candidate feature string are identified, the transition probability of each two adjacent characters is determined according to the first-order Markov transition probability matrix, and further the transition entropy of the candidate feature string is determined according to the following formula:

$$H = -\sum_{i=1}^{n-1} p(s_i, s_{i+1}) \times \log p(s_i, s_{i+1}).$$

Where, n represents the number of characters contained in a candidate feature string, p ($s_i$, $s_{i+1}$) represents a transition probability of transition of the i-th character $s_i$ in a candidate feature string to the (i+1)-th character $s_{i+1}$, and H represents a transition entropy of the candidate feature string.

The process of determining the transition entropy of the candidate feature string will be described below through a specific example.

For example, a candidate feature string is abcd, where a, b, c and d are respectively characters in the candidate feature string. According to the first-order Markov transition probability matrix, the transition probability p (a, b) from character a to character b, the transition probability p (b, c) from character b to character c and the transition probability p (c, d) from character c to character d can be determined, and further the transition entropy of the candidate feature string abcd is determined to be:

$$H=-[p(a,b)\log p(a,b)+p(b,c)\log p(b,c)+p(c,d)\log p(c,d)]$$

In the related art, quantitative evaluation cannot be performed on the extracted feature strings, and protocol analysts cannot judge validity degree of the feature strings, can only select feature strings according to experience, and then verify the feature strings combination by combination, thereby wasting a lot of manpower and material resources. As to the method for extracting a feature string provided in the embodiments of the present disclosure, for each candidate feature string, the transition entropy of the candidate feature string can be determined according to the first-order Markov transition probability matrix, quantitative evaluation of the candidate feature strings can be realized according to the transition entropy, the greater the transition entropy is, the higher the validity degree is, therefore, the candidate feature string which is not smaller than the preset threshold is labeled as a first usable feature string, and the candidate feature string which is smaller than the preset threshold is labeled as a feature string to be discarded, thereby further verifying the validity of the first usable feature string, greatly reducing the verification times of the feature strings, and reducing input of manpower and material resources.

Embodiment 3

In order to reduce the calculating amount of extracting the feature string, and ensure validity of the extracted feature string as far as possible, on the basis of each of the above embodiments, in the embodiments of the present invention, the operation of, for the each first session, determining the data packets having feature strings to be extracted in the first session includes: for the each first session, acquiring a preset quantity of data packets in the first session in a preset data packet transmission direction, and taking the preset quantity of data packets as the data packets having feature strings to be extracted in the first session.

The network apparatus saves a preset data packet transmission direction, where the preset data packet transmission direction can be a direction from a client to a server, or a direction from a server to a client, or a direction from a client to a server and from a server to a client. Moreover, the network apparatus saves a preset quantity of data packets, after each first session is determined, for each first session, the transmission direction of each data packet in the first session is identified, and on the preset data packet transmission direction, the preset quantity of data packets in the first session are taken as data packets having feature strings to be extracted in the first session.

Specifically, if the preset data packet transmission direction is a direction from a client to a server, then the data packets transmitted from the client to the server in the first session are identified, and a preset quantity of any data packets, in the data packets transmitted from the client to the server, are taken as the data packets having feature strings to be extracted in the first session. Preferably, after the data packets transmitted from a client to a server in the first session are identified, the identified data packets can be sorted in a chronological order, and a preset quantity of data packets which are earlier chronologically are taken as the data packets having feature strings to be extracted in the first session.

If the preset data packet transmission direction is a direction from a server to a client, then the data packets transmitted from the server to the client in the first session are identified, and a preset quantity of any data packets, in the data packets transmitted from the server to the client, are taken as the data packets having a feature string to be extracted in the first session. Preferably, after the data packets transmitted from a server to a client in the first session are identified, the identified data packets can be sorted in a chronological order, and a preset quantity of data packets which are earlier chronologically are taken as the data packets having a feature string to be extracted in the first session.

If the preset data packet transmission direction is a direction from a client to a server and from a server to a client, then a preset quantity of any data packets are taken as the data packets having a feature string to be extracted in the first session. Preferably, the data packets in the first session can be sorted in a chronological order, and a preset quantity of data packets which are earlier chronologically are taken as the data packets having a feature string to be extracted in the first session.

Since in the embodiments of the present invention, for each first session, a preset quantity of data packets in the first session are acquired in a preset data packet transmission direction, and the preset quantity of data packets are taken as the data packets having a feature string to be extracted in the first session, thereby greatly reducing the calculating amount for extracting the feature string. Moreover, the feature string is extracted based on the preset quantity of data packets which are earlier chronologically, such that the validity of the extracted feature string is higher.

Embodiment 4

In order that the particle for determining the data packet is more accurate, on the basis of each of the above embodiments, in the embodiments of the present invention, the operation of, for the data packets having feature strings to be extracted, determining the participles of the data packets includes: for the data packets having feature strings to be extracted, judging whether the data packets are hyper text transfer protocol (HTTP) data packets; if the data packets are the HTTP data packets, determining the participles of the data packets according to a predefined regular expression, if the data packets are not the HTTP data packets, determining the participles of the data packets according to an N-Gram language model.

For a data packet having a feature string to be extracted, the network apparatus can judge whether the data packet is an HTTP data packet. Specifically, whether the data packet is an HTTP data packet can be judged according to whether the data packet contains a key feature string related to HTTP. For example, the key feature string related to HTTP is "HTTP/1.1". For the data packet having a feature string to be extracted, whether the data packet contains such feature string as "HTTP/1.1" is judged, if so, the data packet is determined to be an HTTP data packet, otherwise, the data packet is determined not to be an HTTP data packet. Where, the key feature string related to HTTP is "HTTP/1.1", which is only an example. In the embodiments of the present invention, the key feature string related to HTTP is not limited herein.

Specifically, the process of determining the data packet to be an HTTP data packet belongs to the related art, and the process will not be repeated redundantly herein.

If the data packet having a feature string to be extracted is determined to be an HTTP data packet, due to the format standard of the HTTP data packet, then the participle of the data packet can be determined according to a predefined regular expression. Where, the network apparatus can acquire an HTTP data packet in advance, and the regular expression is defined according to the acquired HTTP data packet. For the HTTP data packet, the format of determined participle of the data packet determined according to the regular expression is standard, and the generated participles are also less.

If the data packet having a feature string to be extracted is determined to be a non-HTTP data packet, since the non-HTTP data packet has no fixed format, therefore, the regular expression cannot be defined in advance to determine a participle. For a non-HTTP data packet, the participle of the data packet can be determined according to N-Gram. Where the value of N can traverse the integers in an interzone of [1, 10], or traverse the integers in an interzone of [2, 13], preferably, the value of N can traverse the integers in an interzone of [3, 15]. For a non-HTTP data packet, according to N-Gram, the quantity of determined participles of the data packet is relatively large. Where, the process of determining the participle of the data packet according to N-Gram belongs to the related art, and this process is not repeated redundantly herein.

Since in the embodiments of the present invention, the participle of the HTTP data packet is determined according to a predefined regular expression, and the participle of the non-HTTP data packet is determined according to N-Gram, therefore, the participle of the data packet can be determined more accurately. Moreover, since the determination of the participle of a data packet based on a regular expression and N-Gram is introduced, then the semantic information contained in the data packet can be interpreted and acquired.

Embodiment 5

In order that the first-order Markov transition probability matrix can be determined more accurately, on the basis of each of the above embodiments, in the embodiments of the present invention, the operation of determining the first-order Markov transition probability matrix containing the transition probability of each two adjacent characters according to the existing rule base and the current genetic variation coefficient includes: reading an existing rule base; for each two adjacent characters in the existing rule base, counting the number of occurrence of the two adjacent characters; counting a quantity of occurrence of a previous character in the two adjacent characters among the characters, except a last character, in the existing rule base; determining the transition probability of the two adjacent characters according to a ratio of the number of occurrence of the two adjacent characters to the number of occurrence of the previous character in the two adjacent characters; and determining the transition matrix containing the transition probability of each two adjacent characters according to the transition probability of each two adjacent characters and the current genetic variation coefficient.

The existing rule base contains each character, when the network apparatus determines the first-order Markov transition probability matrix, through reading an existing rule base and for each two adjacent characters in the existing rule base, the network apparatus can count the number of occurrence of the two adjacent characters, and can count the number of occurrence of the previous character in the two adjacent characters among the characters, except the last character, in the existing rule base, and can determine the transition probability of the two adjacent characters according to the number of occurrence of the two adjacent characters, the number of occurrence of the previous character in the two adjacent characters and the current genetic variation coefficient. Specifically, the ratio of the number of occurrence of the two adjacent characters to the number of occurrence of the previous character in the two adjacent characters is taken as the initial transition probability of the two adjacent characters, and the product of the initial transition probability of the two adjacent characters and the current genetic variation coefficient is taken as the transition probability of the two adjacent characters. Further, the first-order Markov transition probability matrix containing a transition probability of each two adjacent characters can be determined according to the transition probability of each two adjacent characters.

For example, for two adjacent characters ab, the network apparatus counts that the characters ab occur in the existing rule base for 150 times, while in all the characters, except the last character, in the existing rule base, the network apparatus counts that the character a occurs for 600 times, and then the initial transition probability of two adjacent characters ab is determined to be 150/600=0.25. If the current genetic variation coefficient is 1, then the transition probability of two adjacent characters ab is 0.25*1=0.25.

In this way, the network apparatus can determine the transition probability of each two adjacent characters, and can further determine the first-order Markov transition probability matrix containing a transition probability of each two adjacent characters according to the transition probability of each two adjacent characters.

In the embodiments of the present invention, for each two adjacent characters in the existing rule base, the network apparatus determines the transition probability of the two adjacent characters according to the number of occurrence of the two adjacent characters, the number of occurrence of the previous character in the two adjacent characters, and the current genetic variation coefficient. The network apparatus determines the first-order Markov transition probability matrix containing a transition probability of each two adjacent characters according to the transition probability of each two adjacent characters, such that the first-order Markov transition probability matrix can be determined more accurately.

Moreover, the method for extracting a feature string in the related art heavily depends on experience accumulation of protocol analysts, while the existing application identification rule bases are usually very large, and contain thousands of feature strings, however, nobody can completely remember the content of the feature string of each rule, therefore, in the related art, the existing rule bases cannot be completely and sufficiently utilized through manual analysis. As to the method for extracting a feature string provided in embodiments of the present invention, the first-order Markov transition probability matrix is determined according to all the characters contained in the existing rule base, and further the feature string is extracted based on the first-order Markov transition probability matrix, therefore, all the information contained in the rule bases can be sufficiently utilized.

Embodiment 6

In order to simplify the determined feature string to the greatest extent, on the basis of each of the above embodiments, in the embodiments of the present invention, before the candidate feature string is labeled to be a first usable feature string, the method further includes: recombining in sequence characters contained in the candidate feature string from front to back, to constitute multiple sub-candidate feature strings; for each sub-candidate feature string, determining the transition probability of each two adjacent characters in the sub-candidate feature string according to the first-order Markov transition probability matrix, and determining an entropy wave value of the sub-candidate feature string according to the transition probability of the character group constituted by each two adjacent characters in the sub-candidate feature string, the logarithm of the transition probability, and the quantity of character groups contained in the sub-candidate feature string; and for the candidate feature string, identifying a target sub-candidate feature string having the largest entropy wave value in the candidate feature string, determining the redundancy of the candidate feature string according to the ratio of the entropy wave value of the target sub-candidate feature string to the transition entropy of the candidate feature string; judging whether the redundancy of the candidate feature string is greater than a preset redundancy threshold, when the redundancy of the candidate feature string is not greater than the preset redundancy threshold, keeping the candidate character string unchanged; when the redundancy of the candidate feature string is greater than the preset redundancy threshold, updating the candidate feature string by adopting the target sub-candidate feature string.

After the network apparatus determines each candidate feature string, for each candidate feature string, the network apparatus recombines the characters contained in the candidate feature string from front to back, to constitute multiple sub-candidate feature strings. In this way, the quantity of constituted sub-candidate feature strings is obtained by subtracting 1 from the quantity of characters contained in the candidate feature string.

For example, a certain candidate feature string is abcde, then through recombination in sequence from front to back, the constituted multiple sub-candidate feature strings are respectively ab, abc, abcd and abcde.

After the network apparatus determines multiple sub-candidate feature strings of the candidate feature string for each candidate feature string, for each candidate feature string, the network apparatus can determine the transition probability of the character group constituted by each two adjacent characters in the sub-candidate feature string according to the first-order Markov transition probability matrix. Then the network apparatus calculates the logarithm of the transition probability, and can further determine the entropy wave value of the sub-candidate feature string according to the transition probability of the character group constituted by each two adjacent characters, the logarithm of the transition probability, and the quantity of character groups contained in the sub-candidate feature string.

Where, the product of the transition probability of the character group constituted by each two adjacent characters and the logarithm of the transition probability can be calculated, then the entropy wave value of the sub-candidate feature string is determined according to the ratio of the product to the quantity of the character groups contained in the sub-candidate feature string, the quotient of the transition probability of the character group constituted by each two adjacent characters and the logarithm of the transition probability can also be calculated, and then the entropy wave value of the sub-candidate feature string is determined according to the ratio of the quotient to the quantity of the character groups contained in the sub-candidate feature string.

The network apparatus can identify the target sub-candidate feature string having the largest entropy wave value in the candidate feature string, moreover, since the transition entropy of the candidate feature string has been determined, the redundancy of the candidate feature string can be determined according to the ratio of the entropy wave value of the target sub-candidate feature string to the transition entropy of the candidate feature string. The network apparatus saves a preset redundancy threshold, whether the redundancy of a candidate feature string is greater than a preset redundancy threshold is judged, if so, then the candidate feature string can be simplified, at this time, the candidate feature string is updated with the target sub-candidate feature string, while if the redundancy of the candidate feature string is not greater than the preset redundancy threshold, then the candidate feature string does not need to be simplified, at this time, the candidate feature string is kept unchanged.

For example, if the target sub-candidate feature string having the largest entropy wave value in a certain candidate feature string abcde is abc, then the redundancy of the candidate feature string can be determined according to the ratio of the entropy wave value of the target sub-candidate feature string abc to the transition entropy of the candidate feature string abcde. If the redundancy of the candidate feature string is greater than a preset redundancy threshold, then the candidate feature string abcde is updated with the target sub-candidate feature string abc in the candidate feature string; if the redundancy of the candidate feature string is not greater than the preset redundancy threshold, then the candidate feature string abcde is kept unchanged.

In order that the entropy wave value of the sub-candidate feature string can be determined more accurately, in the embodiments of the present invention, the operation of determining the entropy wave value of the sub-candidate feature string according to the transition probability of the character group constituted by each two adjacent characters in the sub-candidate feature string, the logarithm of the transition probability, and the quantity of character groups contained in the sub-candidate feature string includes: calculating the product of the transition probability of the character group constituted by each two adjacent characters in the sub-candidate feature string and the logarithm of the transition probability, summing each obtained product, and determining the ratio of the obtained sum to the quantity of character groups contained in the sub-candidate feature string, and taking the negative number of the ratio as an entropy wave value of the sub-candidate feature string.

After the network apparatus determines multiple sub-candidate feature strings of the candidate feature string for each candidate feature string, for each sub-candidate feature string, the network apparatus determines the transition probability of the character group constituted by each two adjacent characters in the sub-candidate feature string according to the first-order Markov transition probability matrix. Then the network apparatus calculates the logarithm of the transition probability of the character group constituted by each two adjacent characters, further calculates the product of the transition probability of the character group constituted by each two adjacent characters in the sub-candidate feature string and the logarithm of the transition probability, sums each obtained product, determines the ratio of the obtained sum to the quantity of character groups contained in the sub-candidate feature string, and takes the negative number of the ratio as the entropy wave value of the sub-candidate feature string.

Specifically, the entropy wave value of the sub-candidate feature string can be determined according to the following formula:

$$A = \frac{-\sum_{i=1}^{m} p(s_{i-1}, s_i) \times \log p(s_{i-1}, s_i)}{m}, m \in [1, n-1].$$

Where, n represents the quantity of characters contained in a candidate feature string, m represents the quantity of characters contained in each sub-candidate feature string, $p(s_{i-1}, s_i)$ represents the transition probability of transition from the (i−1)-th character $s_{i-1}$ in the sub-candidate feature string to the i-th character $s_i$, and A represents the entropy wave value of the sub-candidate feature string, where when m=1, $p(s_{i-1}, s_i)$=1.

The process of determining the entropy wave value of the sub-candidate feature string will be described below through a specific example.

For example, a certain sub-candidate feature string is abc, where a, b and c are respectively characters in the sub-candidate feature string. According to the first-order Markov transition probability matrix, the transition probability p (a, b) from character a to character b and the transition probability p (b, c) from character b to character c can be determined, and further the entropy wave value of the sub-candidate feature string abc is determined to be:

$$A = -[p(a,b)\log p(a,b) + p(b,c)\log p(b,c)]/2.$$

Figure 2:
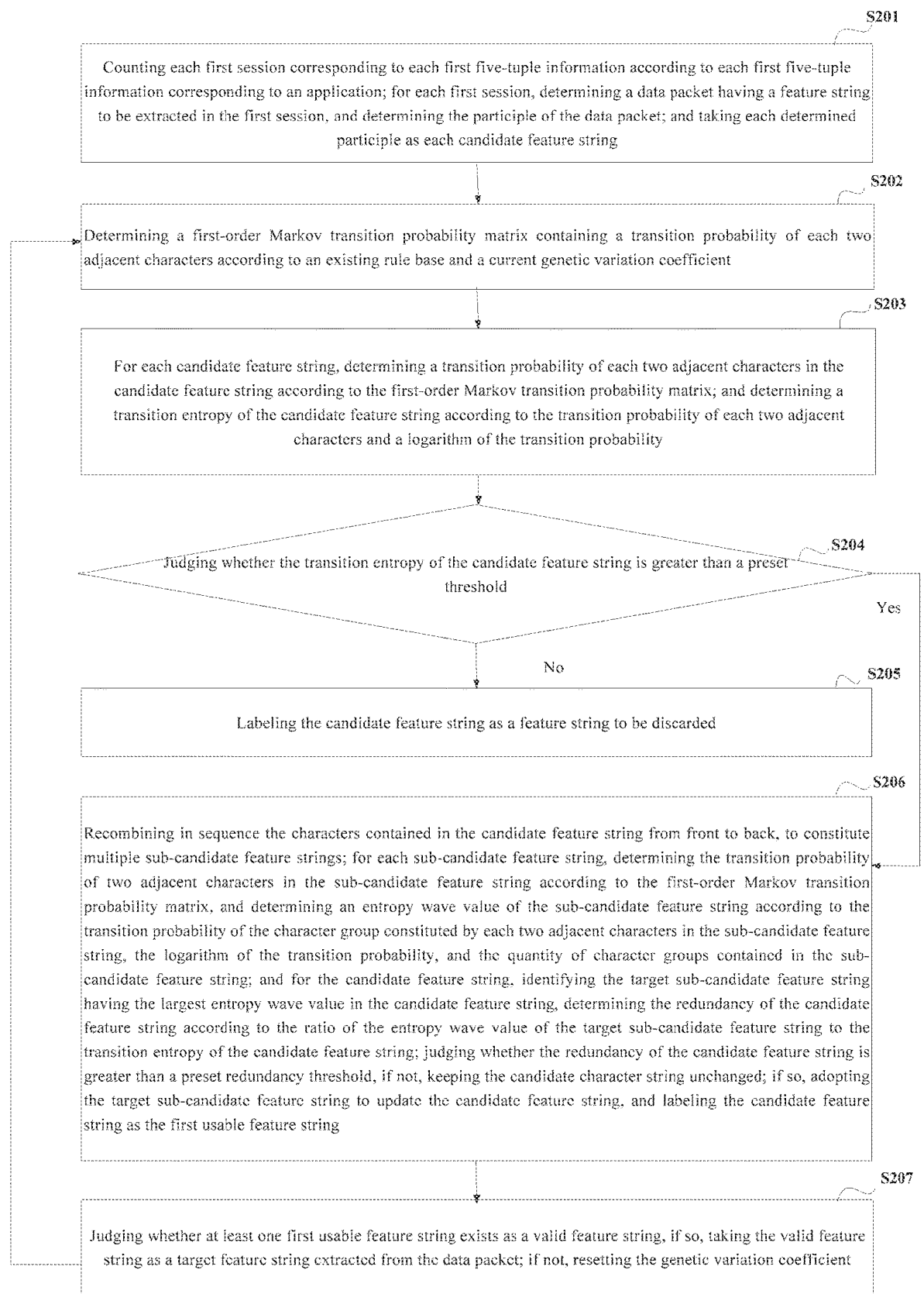
FIG. 2 is a schematic diagram of a process for extracting a feature string provided in Embodiment 6 of the present invention.

FIG. 2 is a schematic diagram of a process for extracting a feature string provided in embodiments of the present invention, and the process includes the following operations.

S201: counting each first session corresponding to each first five-tuple information according to each first five-tuple information corresponding to an application; for each first session, determining a data packet having a feature string to be extracted in the first session, and determining the participle of the data packet; and taking each determined participle as each candidate feature string.

S202: determining a first-order Markov transition probability matrix containing a transition probability of each two adjacent characters according to an existing rule base and a current genetic variation coefficient.

S203: for each candidate feature string, determining a transition probability of each two adjacent characters in the candidate feature string according to the first-order Markov transition probability matrix; and determining a transition entropy of the candidate feature string according to the transition probability of each two adjacent characters and a logarithm of the transition probability.

S204: judging whether the transition entropy of the candidate feature string is greater than a preset threshold, if the transition entropy of the candidate feature string is not greater than a preset threshold, then performing S205, if the transition entropy of the candidate feature string is greater than a preset threshold, performing S206.

S205: labeling the candidate feature string as a feature string to be discarded.

S206: recombining in sequence the characters contained in the candidate feature string from front to back, to constitute multiple sub-candidate feature strings; for each sub-candidate feature string, determining the transition probability of two adjacent characters in the sub-candidate feature string according to the first-order Markov transition probability matrix, and determining an entropy wave value of the sub-candidate feature string according to the transition probability of the character group constituted by each two adjacent characters in the sub-candidate feature string, the logarithm of the transition probability, and the quantity of character groups contained in the sub-candidate feature string; and for the candidate feature string, identifying the target sub-candidate feature string having the largest entropy wave value in the candidate feature string, determining the redundancy of the candidate feature string according to the ratio of the entropy wave value of the target sub-candidate feature string to the transition entropy of the candidate feature string; judging whether the redundancy of the candidate feature string is greater than a preset redundancy threshold, if not, keeping the candidate character string unchanged; if so, adopting the target sub-candidate feature string to update the candidate feature string, and labeling the candidate feature string as the first usable feature string.

S207: judging whether at least one first usable feature string exists as a valid feature string, if so, taking the valid feature string as a target feature string extracted from the data packet; if not, resetting the genetic variation coefficient, and performing S202.

In the related art, the extracted feature string cannot be further simplified. The main reason is as follows: when the feature string is too long, constraints on application identification will be enhanced accordingly, and misidentification does not easily occur, however, the generalization ability of the feature string is poor; when the feature string is too short, constraints on the application identification is relatively weak, misidentification easily occurs, however, the generalization ability of the feature string is enhanced. Since in the related art, quantized feature string redundancy cannot be provided, therefore, in the related art, the generalization ability and the constraints are difficult to balance. To ensure the constraint ability on application identification, that is, to cause no misidentification, the generalization ability is often sacrificed in the related art, thereby further leading to a feature string which is too long and redundant. Moreover, since the extracted feature string is redundant, the rule base will be redundant, and needs to be updated frequently.

While in the embodiments of the present invention, for each candidate feature string, the target sub-candidate feature string of the candidate feature string can be determined, and then the redundancy of the candidate feature string is determined according to the ratio of the entropy wave value of the target sub-candidate feature string and the transition entropy of the candidate feature string. If the redundancy of the candidate feature string is greater than a preset redundancy threshold, the candidate feature string is updated through the target sub-candidate feature string, in this way, the feature string can be simplified. A redundancy index of the feature string is introduced to the present invention, such that the feature string is possibly simplified when the feature string is valid, thereby effectively balancing the constraint ability and the generalization ability, lowering redundancy degree of the rule base, further reducing frequency for updating the rule base, and reducing input in rule maintenance.

After extracting a feature string, the network apparatus can verify whether the extracted feature string is valid, and through each of the following embodiments, a brief description is given below on the process of verifying whether the extracted feature string is valid.

Embodiment 7

In order that the verification on whether the first usable feature string is valid is more accurate, on the basis of each of the above embodiments, in embodiments of the present invention, the operation of judging whether at least one usable feature string exists as the valid feature string includes: for the each first session, determining each first field information corresponding to each first usable feature string of the first session; counting each second session corresponding to each second five-tuple information according to each second five-tuple information corresponding to the application; for the each second session, acquiring each feature string in data packets of the second session, and taking the first usable feature string in the first session in corresponding match with the feature string as a second usable feature string; according to each second usable feature string, determining each second field information corresponding to the second session; and judging whether each second field information of the second session is correspondingly the same as the first field information contained in any first session, if the each second field information of the second session is correspondingly the same as the first field information contained in any first session, blocking the second session; and counting a first quantity of blocked second sessions, and a total second quantity of second sessions transmitted by the application; and judging whether the first quantity is the same as the second quantity, if the first quantity is the same as the second quantity, judging each first usable feature string to be the valid feature string.

For each first session, after the network apparatus determines each first usable feature string of the first session, the network apparatus can determine each field information corresponding to each first usable feature string according to each first usable feature string.

For example, it is determined that the field information corresponding to the first usable feature string Mozilla is User-Agent, the field information corresponding to the first usable feature string Windows is User-Agent, the field information corresponding to the first usable feature string wifi is Type, and the field information corresponding to the first usable feature string LG3217 is device.

Where, the process of determining each field information corresponding to each first usable feature string belongs to the related art, and the process will not be repeated redundantly herein.

When validity of the feature string is verified, the client triggers the application again, the application performs session transmission, and the client can acquire each second five-tuple information corresponding to an application, and sends each second five-tuple information to a network apparatus. The network apparatus receives each second five-tuple information sent by the client, counts each second session corresponding to each second five-tuple information according to each second five-tuple information, and saves each second session locally to be used in the subsequent validity verification process of the feature string.

For each second session, the network apparatus acquires each feature string in the data packet of the second session, and then matches each feature string in the data packet of the second session with each first usable feature string in the first session. The correspondingly matched first usable feature strings are taken as second usable feature strings. According to each second usable feature string, each second field information corresponding to each second usable feature string can be determined, and each second field information corresponding to each second usable feature string is taken as each second field information corresponding to the second session. Whether each second field information of the second session is correspondingly the same as the first field information contained in any first session is further judged, if so, the second session is blocked, otherwise, the second session is not blocked.

Still with the above example for illustration, for example, it is determined that the field information corresponding to the first usable feature string Mozilla is User-Agent, the field information corresponding to the first usable feature string Windows is User-Agent, the field information corresponding to the first usable feature string wifi is Type, and the field information corresponding to the first usable feature string LG3217 is device. For the data packet in the second session, the feature string in the data packet is acquired, and then the feature strings in the data packet are matched with the first usable feature strings Mozilla, Windows, wifi and LG3217. If the correspondingly matched second usable feature strings are Mozilla, wifi and LG3217, or Windows, wifi and LG3217, then each second field information of the second session is correspondingly the same as the first field information contained in the first session, and the second field information and the first field information are both User-Agent, Type, and device, at this time, the second session is blocked, otherwise, the second session is not blocked.

Then, the network apparatus counts the first quantity of the blocked second sessions, and counts the total second quantity of the second sessions transmitted by the application. Whether the first quantity is the same as the second quantity is further judged, if the first quantity is the same as the second quantity, it indicates that all the second sessions are just blocked, and no second session is subjected to misdeclaration or is failed to be declared, therefore, each first usable feature string is judged to be valid. If the first quantity is greater than the second quantity, it indicates that at this time, besides the second sessions which are blocked, other sessions are also blocked, at this time, misdeclaration occurs, and each first usable feature string is judged to be invalid.

For example, the network apparatus counts that the first quantity of blocked second sessions is 100, the total second quantity of the second sessions transmitted by the application is also 100, at this time, the first quantity is the same as the second quantity, then each first usable feature string is judged to be valid. If the total second quantity of the second sessions transmitted by the application is 95, then besides the second sessions which are blocked, 5 other sessions are also blocked, that is to say, misdeclaration occurs, at this time, each first usable feature string is judged to be invalid.

Figure 3:
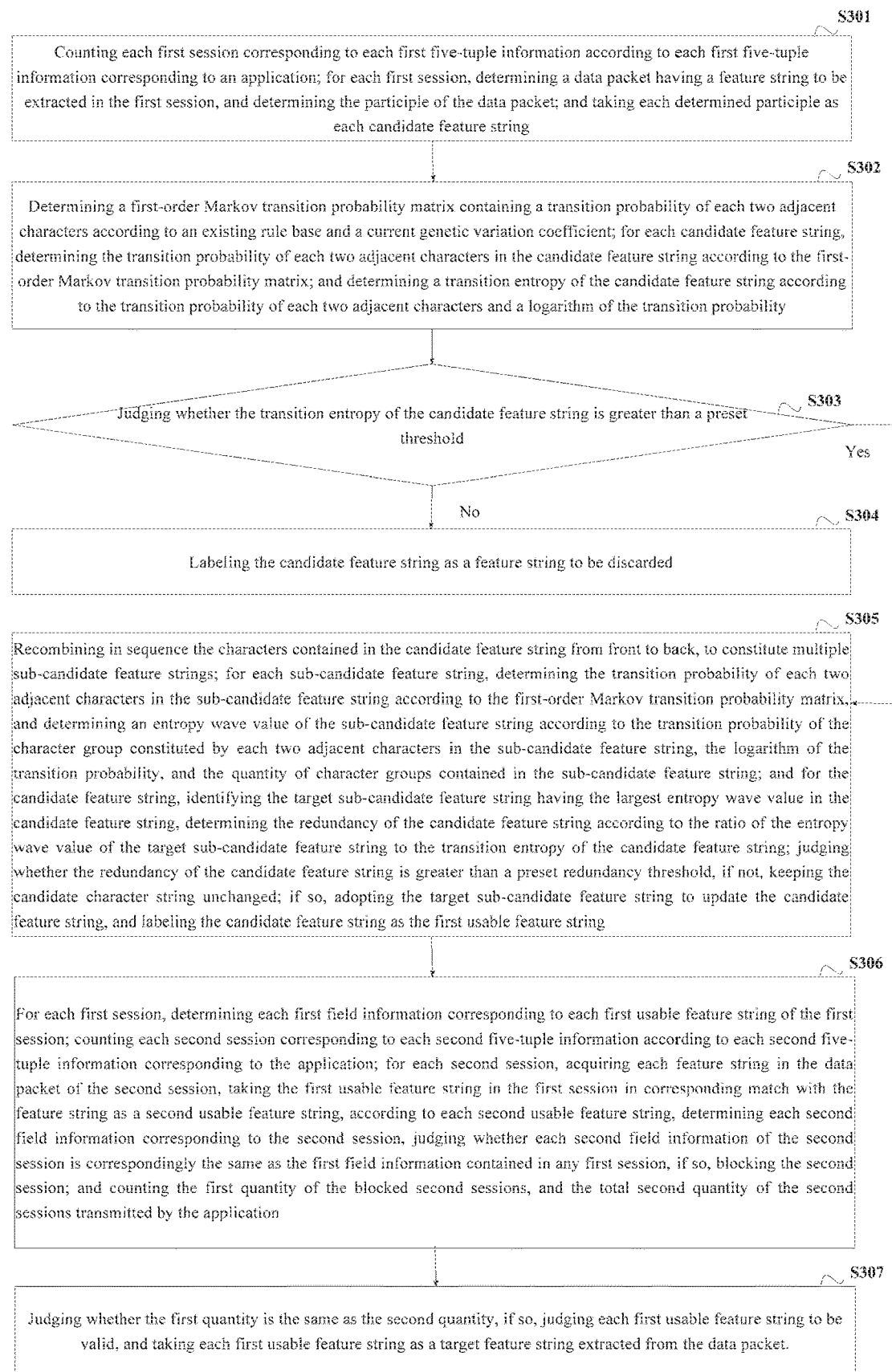
FIG. 3 is a schematic diagram of a process for extracting a feature string provided in Embodiment 7 of the present invention.

FIG. 3 is a schematic diagram of a process for extracting a feature string provided in an embodiment of the present invention, and the process includes the following operations.

S301: counting each first session corresponding to each first five-tuple information according to each first five-tuple information corresponding to an application; for each first session, determining a data packet having a feature string to be extracted in the first session, and determining the participle of the data packet; and taking each determined participle as each candidate feature string.

S302: determining a first-order Markov transition probability matrix containing a transition probability of each two adjacent characters according to an existing rule base and a current genetic variation coefficient; for each candidate feature string, determining the transition probability of each two adjacent characters in the candidate feature string according to the first-order Markov transition probability matrix; and determining a transition entropy of the candidate feature string according to the transition probability of each two adjacent characters and a logarithm of the transition probability.

S303: judging whether the transition entropy of the candidate feature string is greater than a preset threshold, if the transition entropy of the candidate feature string is not greater than a preset threshold, performing S304, if the transition entropy of the candidate feature string is greater than a preset threshold, performing S305.

S304: labeling the candidate feature string as a feature string to be discarded.

S305: recombining in sequence the characters contained in the candidate feature string from front to back, to constitute multiple sub-candidate feature strings; for each sub-candidate feature string, determining the transition probability of each two adjacent characters in the sub-candidate feature string according to the first-order Markov transition probability matrix, and determining an entropy wave value of the sub-candidate feature string according to the transition probability of the character group constituted by each two adjacent characters in the sub-candidate feature string, the logarithm of the transition probability, and the quantity of character groups contained in the sub-candidate feature string; and for the candidate feature string, identifying the target sub-candidate feature string having the largest entropy wave value in the candidate feature string, determining the redundancy of the candidate feature string according to the ratio of the entropy wave value of the target sub-candidate feature string to the transition entropy of the candidate feature string; judging whether the redundancy of the candidate feature string is greater than a preset redundancy threshold, if not, keeping the candidate character string unchanged; if so, adopting the target sub-candidate feature string to update the candidate feature string, and labeling the candidate feature string as the first usable feature string.

S306: for each first session, determining each first field information corresponding to each first usable feature string of the first session; counting each second session corresponding to each second five-tuple information according to each second five-tuple information corresponding to the application; for each second session, acquiring each feature string in the data packet of the second session, taking the first usable feature string in the first session in corresponding match with the feature string as a second usable feature string, according to each second usable feature string, determining each second field information corresponding to the second session, judging whether each second field information of the second session is correspondingly the same as the first field information contained in any first session, if so, blocking the second session; and counting the first quantity of the blocked second sessions, and the total second quantity of the second sessions transmitted by the application.

S307: judging whether the first quantity is the same as the second quantity, if the first quantity is the same as the second quantity, judging each first usable feature string to be valid, and taking each first usable feature string as a target feature string extracted from the data packet.

In the embodiments of the present invention, when the first quantity of blocked second session is judged to be the same as the total second quantity of the second sessions transmitted by the application, it indicates that the second sessions can all be blocked, and no misdeclaration or failure in declaration occurs, therefore, each first usable feature string can accurately identify the second sessions in the application, and can accurately judge that each first usable feature string is valid. Therefore, the verification on whether the first usable feature string is valid is more accurate.

Embodiment 8

When the second quantity is greater than the first quantity, that is, part of the second sessions are not blocked, however, in the process of session transmission, other sessions may be disguised as the second session, in this way, other sessions cannot be blocked, however, it cannot indicate that the first usable feature string is invalid. When sessions are disguised, the data traffic and quantity of the disguised sessions are generally small.

Therefore, in order to further ensure a more accurate verification on whether the first usable feature string is valid, on the basis of the each of the above embodiments, in the embodiments of the present invention, if the second quantity is determined to be greater than the first quantity, the method further includes: counting a blocked first data traffic and a total second data traffic transmitted by the application; and judging whether a ratio of the first data traffic to the second data traffic is greater than a preset threshold; and/or judging whether the ratio of the first quantity to the second quantity is greater than a preset second threshold; if the ratio of the first data traffic to the second data traffic is greater than the preset first threshold and/or the ratio of the first quantity to the second quantity is greater than the preset second threshold, judging each first usable feature string to be the valid feature string.

If the second quantity is greater than the first quantity, the network apparatus can calculate the ratio of the first quantity to the second quantity, the network apparatus saves a preset second threshold, and judges whether the ratio of the first quantity to the second quantity is greater than a preset second threshold, if the ratio of the first quantity of the second quantity is greater than the preset second threshold, the unblocked second session can be deemed to be a disguised session, at this time, each first usable feature string is still judged to be a valid feature string. Where, the preset second threshold can be 95%, 98%, etc.

In addition, the network apparatus can count the blocked first data traffic and the total second data traffic transmitted by the application, and can calculate the ratio of the blocked first data traffic to the second data traffic. The network apparatus saves a preset first threshold, and judges whether the ratio of the blocked first data traffic to the second data traffic is greater than a preset first threshold, if so, the unblocked second session can be deemed to be the disguised session, at this time, each first usable feature string is still judged to be a valid feature string. Where, the preset first threshold and the preset second threshold can be the same or different.

Preferably, in order that the verification on whether the first usable feature string is valid is more accurate, when the network apparatus judges that the ratio of the first quantity to the second quantity is greater than a preset second threshold, and judges that the ratio of the blocked first data traffic to the second data traffic is greater than a preset first threshold, each first feature string is judged to be a valid feature string.

A specific example is taken below for illustration.

For example, the preset first threshold is 0.96, and the preset second threshold is 0.95. The first quantity of the second sessions blocked by the network apparatus is 100, the total second quantity of the second sessions transmitted by the application is 105, the ratio of the first quantity to the second quantity is 100/105=0.952, 0.952 is greater than a preset second threshold 0.95. The blocked first data traffic is 80 M, the total second data traffic transmitted by the application is 82 M, the ratio of the blocked first data traffic to the total second data traffic transmitted by the application is 80/82=0.975, and 0.975 is greater than a preset first threshold 0.96. At this time, each first usable feature string is judged to be a valid feature string.

Since in the embodiment of the present invention, if the second quantity is greater than the first quantity, when the ratio of the blocked first data traffic to the total second data traffic transmitted by the application is greater than a preset first threshold, and the ratio of the first quantity to the second quantity is greater than a preset second threshold, each first usable feature string is judged to be a valid feature string, thereby avoiding the influence of disguised sessions, and further making the verification on whether the first usable feature string is valid more accurate.

Embodiment 9

If the ratio of the first data traffic to the second data traffic is not greater than a preset first threshold; or if the ratio of the first quantity to the second quantity is not greater than a preset second threshold, at this time, it indicates a failure in declaration. In order to ensure that the extracted feature string can effectively identify the session in the application, on the basis of each of the above embodiments, in the embodiments of the present invention, if the ratio of the first data traffic to the second data traffic is not greater than a preset first threshold; or if the ratio of the first quantity to the second quantity is not greater than a preset second threshold, the method further includes:

each first session is taken as the first target session in sequence, and each remaining first session is taken as each third session, and the following operations are performed:

A2, for the each second session, acquiring each feature string in the data packets of the second session, taking the first usable feature string in the third session in corresponding match with the feature string as a third usable feature string; according to each third usable feature string, determining each third field information corresponding to the second session; judging whether the each third field information of the second session is correspondingly the same as the first field information contained in any third session, if the each third field information of the second session is correspondingly the same as the first field information contained in any third session, blocking the second session;

B2, counting a third quantity of the blocked second sessions, and blocked third data traffic;

C2, judging whether the first quantity is the same as the third quantity, and whether the first data traffic is the same as the third data traffic; if the first quantity is different from the third quantity and/or the first data traffic is different from the third data traffic, determining each first usable feature string of the first target session to be valid; if the first quantity is the same as the third quantity, and the first data traffic is the same as the third data traffic, determining each first usable feature string of the first target session to be invalid, and performing D2;

D2, identifying the first usable feature string having the smallest transition entropy in the first target session, and labeling the first usable feature string having the smallest transition entropy as a feature string to be discarded; and taking the first target session adjusted through the feature string and each third session as each fourth session; and E2, for each second session, acquiring each feature string in the data packets of the second session, taking the first usable feature string in the fourth session in corresponding match with the feature string as a fourth usable feature string; according to each fourth usable feature string, determining each fourth field information corresponding to the second session; and judging whether the each fourth field information of the second session is correspondingly the same as the first field information contained in any fourth session, if the each fourth field information of the second session is correspondingly the same as the first field information contained in any fourth session, blocking the second session; counting a fourth quantity of blocked second sessions, and a blocked fourth data traffic; judging whether the first quantity is the same as the fourth quantity, and whether the first data traffic is the same as the fourth data traffic; if the first quantity is different from the fourth quantity, and/or the first data traffic is different from the fourth data traffic, determining the first usable feature string of the first target session adjusted through the feature string to be valid; if the first quantity is the same as the fourth quantity, and the first data traffic is the same as the fourth data traffic, determining the first usable feature string of the first target session adjusted through the feature string to be invalid, and performing D2.

When the second quantity is greater than the first quantity, if the ratio of the first data traffic to the second data traffic is not greater than a preset first threshold, or the ratio of the first quantity to the second quantity is not greater than a preset second threshold, at this time, it indicates that misdeclaration occurs, therefore, whether the first usable feature string of the first session is valid needs to be verified for each first session.

In the embodiment of the present invention, each first session is taken as a first target session in sequence, and each remaining first session is taken as each third session.

Each second session saved locally is retriggered again in the client. For each second session, the network apparatus acquires each feature string in the data packet of the second session, then matches each feature string in the data packet of the second session with each first usable feature string in the third session, and takes the correspondingly matched first usable feature string as the third usable feature string. According to each third usable feature string, the network apparatus can determine each third field information corresponding to each third usable feature string, and takes each third field information corresponding to each third usable feature string as each third field information corresponding to the second session. Further the network apparatus judges whether each third field information of the second session is correspondingly the same as the first field information contained in any third session, if so, the second session is blocked, otherwise, the second session is not blocked.

Then, the network apparatus counts the third quantity of the blocked second sessions, counts the blocked third data traffic, and further judges whether the first quantity is the same as the third quantity, and whether the first traffic data is the same as the third data traffic. Where, the first quantity is the quantity of the second sessions blocked based on the first usable feature string in each first session, the first data traffic is the data traffic blocked based on the first usable feature string in each first session; the third quantity is the quantity of the second sessions blocked based on the first usable feature string in each third session except the first target session, and the third data traffic is the data traffic blocked based on the first usable feature string in each third session except the first target session. If the first quantity is not the same as the third quantity, or if the first data traffic is not the same as the third data traffic, it indicates that the first usable feature string in the first target session is valid in blocking the second session, therefore, each first usable feature string of the first target session is determined to be valid. However, if the first quantity is the same as the third quantity, and the first data traffic is the same as the third data traffic, it indicates that the first usable feature string in the first target session is still invalid in blocking the second session, at this time, each first usable feature string of the first target session is determined to be invalid.

When the second quantity is greater than the first quantity, if each first usable feature string of the first target session is determined to be invalid, due to the excessive quantity of the first usable feature strings of the first target session, a failure in declaration occurs, therefore, the quantity of the first usable feature strings of the first target session can be reduced, then whether the remaining first usable feature strings of the first target session are valid is judged.

Specifically, since the transition entropy of each first usable feature string of the first target session is known, therefore, the first usable feature string having the smallest transition entropy can be identified, and then the first usable feature string having the smallest transition entropy is labeled as the feature string to be discarded. Then the first target session adjusted through the feature string and each third session are taken as each fourth session.

Each second session saved locally is retriggered again in the client. For each second session, the network apparatus acquires each feature string in the data packet of the second session, then matches each feature string in the data packet of the second session with each first usable feature string in the fourth session, and takes the correspondingly matched first usable feature string as the fourth usable feature string. According to each fourth usable feature string, the network apparatus can determine each fourth field information corresponding to each fourth usable feature string, and takes each fourth field information corresponding to each fourth usable feature string as each fourth field information corresponding to the second session. Further the network apparatus judges whether each fourth field information of the second session is correspondingly the same as the first field information contained in any fourth session, if so, the second session is blocked, otherwise, the second session is not blocked.

Then, the network apparatus counts the fourth quantity of the blocked second sessions, counts the blocked fourth data traffic, and further judges whether the first quantity is the same as the fourth quantity, and whether the first traffic data is the same as the fourth data traffic. If the first quantity is not the same as the fourth quantity, or if the first data traffic is not the same as the fourth data traffic, it indicates that the first usable feature string in the first target session adjusted through the feature string is valid in blocking the second session, therefore, each first usable feature string of the first target session adjusted through the feature string is determined to be valid. However, if the first quantity is the same as the fourth quantity, and the first data traffic is the same as the fourth data traffic, it indicates that the first usable feature string in the first target session adjusted through the feature string is still invalid in blocking the second session, at this time, each first usable feature string of the first target session adjusted through the feature string is determined to be invalid.

If each first usable feature string of the first target session adjusted through the feature string is determined to be invalid, the first usable feature string of the first target session is continuously adjusted, that is, the first usable feature string, having the smallest transition entropy, of the first target session is continuously identified, the first usable feature string having the smallest transition entropy is labeled as the feature string to be discarded, and the validity of each first usable feature string of the first target session adjusted through the feature string is verified again, until each first usable feature string of the first target session adjusted through the feature string is determined to be valid.

After each first usable feature string of the first target session adjusted through the feature string is determined to be valid, each first usable feature string of the first target session adjusted through the feature string is adopted to update each first usable feature string of the original first target session. Afterwards, the other first session is taken as the first target session, and each remaining first session is taken as each third session, and the validity of the first usable feature string in the first target session is continuously verified. The verification process is the same as the above process, and will not be repeated redundantly herein.

In addition, if the first usable feature strings of the first target session are all labeled as feature strings to be discarded, the first usable feature strings of the first target session are still judged to be invalid, at this time, the first target session and all its corresponding feature strings are filtered. In the process for verifying other first sessions, the feature strings corresponding to the filtered first target session are not considered.

A specific example is taken for illustration below.

For example, three determined first sessions are available, which are respectively session 1, session 2 and session 3. The field information contained in session 1 is a1, a2 and a3, the first usable feature strings corresponding to field information a1 are x1 and x2, the first usable feature string corresponding to field information a2 is x3, and the first usable feature strings corresponding to field information a3 are x4 and x5. The field information contained in session 2 is b1 and b2, the first usable feature strings corresponding to field information b1 are y1 and y2, and the first usable feature strings corresponding to field information b2 are y3 and y4. The field information contained in session 3 are c1 and c2, the first usable feature strings corresponding to field information c1 are z1 and z2, and the first usable feature strings corresponding to field information c2 are z3 and z4.

First, session 1 is taken as a first target session, and session 2 and session 3 are taken as third sessions. For each second session, each feature string in the data packet of the second session is acquired. If the acquired feature strings are y2 and y3, then the third field information of the third usable feature strings corresponding to the acquired feature strings is respectively b1 and b2, and each third field information is correspondingly the same as the first field information contained in session 2, therefore, the second session is blocked. If the acquired feature strings are y2 and z3, then the third field information of the third usable feature strings corresponding to the acquired feature strings is respectively b1 and c2, and each third field information is not correspondingly the same as the first field information contained in any third session, therefore, the second session is not blocked.

If the quantity of the second sessions blocked based on the first usable feature strings in session 1, session 2 and session 3 is different from the quantity of the second sessions blocked based on the first usable feature strings in session 2 and session 3, or if the data traffic blocked based on the first usable feature strings in session 1, session 2 and session 3 is different from the data traffic blocked based on the first usable feature strings in session 2 and session 3, then the first usable feature string of session 1 is judged to be valid, otherwise, the first usable feature string of session 1 is judged to be invalid.

Then the first usable feature string, having the smallest transition entropy, of session 1 is identified, and the first usable feature string having the smallest transition entropy is labeled as a feature string to be discarded. Then based on session 1 adjusted through the feature string, the first usable feature strings in session 2 and session 3 block the second session. If the quantity of the blocked second sessions is not the same as the quantity of the second sessions blocked based on the first usable feature strings in the original session 1, session 2 and session 3, or if the blocked data traffic is not the same as the data traffic blocked based on the first usable feature string in the original session 1, session 2 and session 3, the first usable feature string of session 1 adjusted through the feature string is judged to be valid, otherwise, the first usable feature string of session 1 adjusted through the feature string is judged to be invalid, at this time, the first usable feature string of session 1 is continuously adjusted, that is, the first usable feature string, having the smallest transition entropy, of session 1 is continuously identified, the first usable feature string having the smallest transition entropy is labeled as a feature string to be discarded, and the validity of each first usable feature string of session 1 adjusted through the feature string is verified again, until each first usable feature string of session 1 adjusted through the feature string is determined to be valid.

Session 2 is further taken as a first target feature string, session 1 and session 3 adjusted through the feature string are taken as a third session, and the validity of the first usable feature string of session 2 is verified. Session 3 is taken as the first target feature string, session 1 and session 2 adjusted through the feature string are taken as a third session, and the validity of the first usable feature string of session 3 is verified, where the process for verifying the validity is the same as the above process, and will not be repeated redundantly herein.

Figure 4:
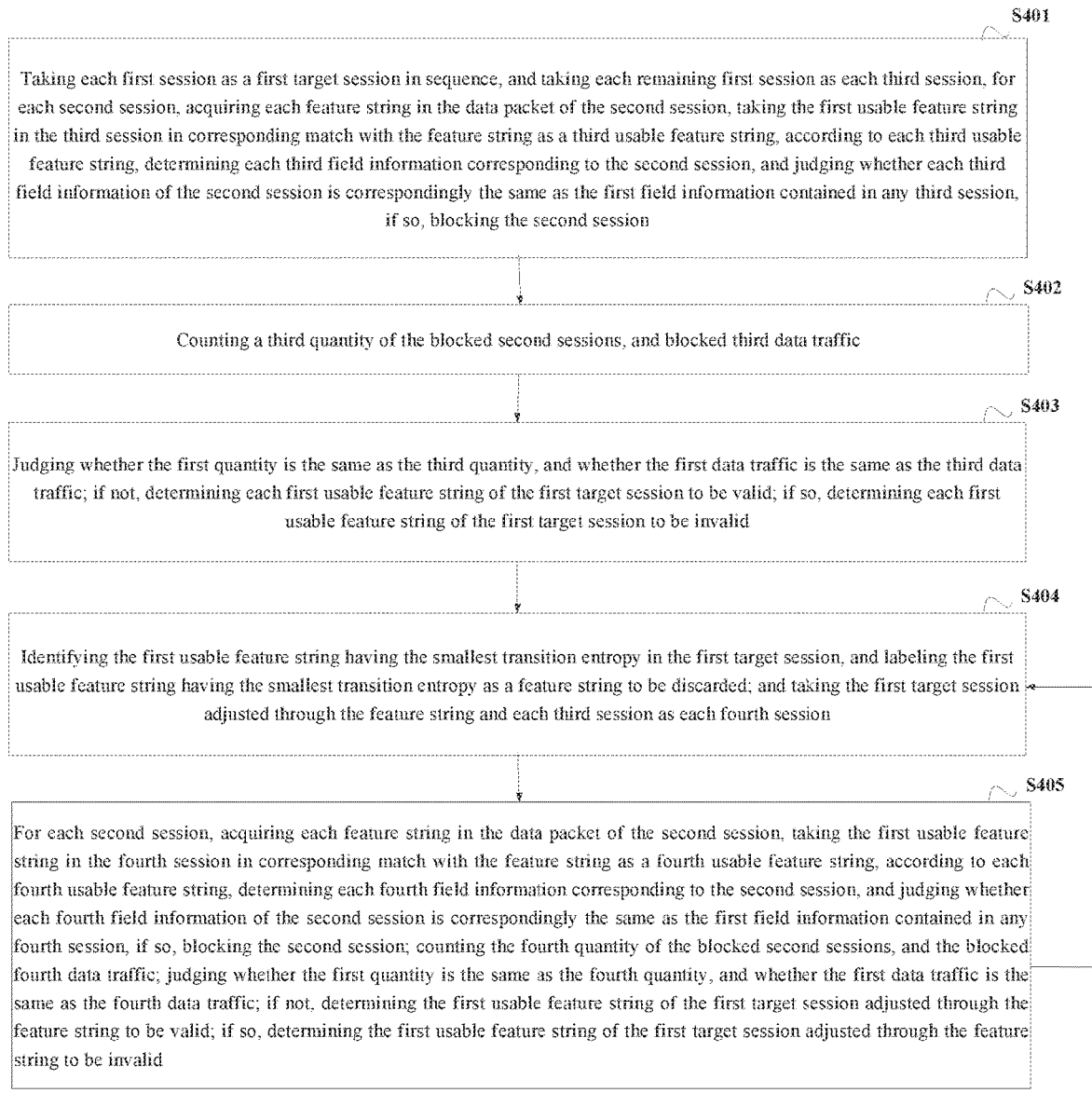
FIG. 4 is a schematic diagram of a process for extracting a feature string provided in Embodiment 9 of the present invention.

FIG. 4 is a schematic diagram of a process for extracting a feature string provided in an embodiment of the present invention, and the process includes the following operations.

S401: taking each first session as a first target session in sequence, and taking each remaining first session as each third session, for each second session, acquiring each feature string in the data packets of the second session, taking the first usable feature string in the third session in corresponding match with the feature string as a third usable feature string, according to each third usable feature string, determining each third field information corresponding to the second session, and judging whether each third field information of the second session is correspondingly the same as the first field information contained in any third session, if the each third field information of the second session is correspondingly the same as the first field information contained in any third session, blocking the second session.

S402: counting a third quantity of the blocked second sessions, and blocked third data traffic.

S403: judging whether the first quantity is the same as the third quantity, and whether the first data traffic is the same as the third data traffic: if the first quantity is different from the third quantity and/or the first data traffic is different from the third data traffic, determining each first usable feature string of the first target session to be valid; if the first quantity is the same as the third quantity, and the first data traffic is the same as the third data traffic, determining each first usable feature string of the first target session to be invalid, and performing S404.

S404: identifying the first usable feature string having the smallest transition entropy in the first target session, and labeling the first usable feature string having the smallest transition entropy as a feature string to be discarded; and taking the first target session adjusted through the feature string and each third session as each fourth session.

S405: for each second session, acquiring each feature string in the data packets of the second session, taking the first usable feature string in the fourth session in corresponding match with the feature string as a fourth usable feature string, according to each fourth usable feature string, determining each fourth field information corresponding to the second session, and judging whether each fourth field information of the second session is correspondingly the same as the first field information contained in any fourth session, if the each fourth field information of the second session is correspondingly the same as the first field information contained in any fourth session, blocking the second session; counting a fourth quantity of blocked second sessions, and a blocked fourth data traffic; judging whether the first quantity is the same as the fourth quantity, and whether the first data traffic is the same as the fourth data traffic; if the first quantity is different from the fourth quantity, and/or the first data traffic is different from the fourth data traffic, determining the first usable feature string of the first target session adjusted through the feature string to be valid; if the first quantity is the same as the fourth quantity, and the first data traffic is the same as the fourth data traffic, determining the first usable feature string of the first target session adjusted through the feature string to be invalid, and performing S404.

Since in the embodiment of the present invention, if the ratio of the first data traffic to the second data traffic is not greater than a preset first threshold, or the ratio of the first quantity to the second quantity is not greater than a preset second threshold, each first session is taken as a first target session in sequence, each remaining first session is taken as each third session, and the validity of the first usable feature string in the first target session is verified. When the first usable feature string in the first target session is invalid, the first usable feature string, having the smallest transition entropy, in the first target session, is labeled as a feature string to be discarded, and the validity of the first usable feature string in the first target session is continuously verified, until each first usable feature string of the first target session adjusted through the feature string is determined to be valid, therefore, the adjusted first usable feature string can be ensured to effectively identify the session in the application.

Embodiment 10

In order to ensure that the extracted feature string can effectively identify the session in the application in case of misdeclaration, on the basis of each of the above embodiments, in the embodiment of the present invention, if the second quantity is determined to be smaller than the first quantity, the method further includes the following operations.

A3, taking any first session as a second target session, taking each remaining first session as each fifth session, identifying the feature string to be discarded, labeled to be the feature string to be discarded having the largest transition entropy, in the second target session, and labeling the feature string to be discarded having the largest transition entropy as the first usable feature string; and taking the second target session adjusted through the feature string and each fifth session as each sixth session.

B3, for each second session, acquiring each feature string in the data packet of the second session, taking the first usable feature string in the sixth session in corresponding match with the feature string as the fifth usable feature string, according to each fifth usable feature string, determining each fifth field information corresponding to the second session, judging whether each fifth field information of the second session is correspondingly the same as the first field information contained in any sixth session, if the each fifth field information of the second session is correspondingly the same as the first field information contained in any sixth session, blocking the second session; counting a fifth quantity of the blocked second sessions, and a blocked fifth data traffic; judging whether the first quantity is the same as the fifth quantity, and whether the first data traffic is the same as the fifth data traffic; if the first quantity is different from the fifth quantity, and/or the first data traffic is different from the fifth data traffic, determining the fifth usable feature string of the second target session adjusted through the feature string to be valid; if the first quantity is the same as the fifth quantity, and the first data traffic is the same as the fifth data traffic, determining the fifth usable feature string of the second target session adjusted through the feature string to be invalid, and performing A3.

When the second quantity is less than the first quantity, due to the excessive quantity of first usable feature strings of the first session, misdeclaration occurs, therefore, the quantity of the first usable feature strings of the first session can be reduced, then whether the remaining first usable feature strings of the first session are valid is judged. In an embodiment of the present invention, also for each first session, whether the first usable feature string of the first session is valid is verified.

Specifically, any first session is taken as the second target session, and each remaining first session is taken as each fifth session. Since the transition entropy of each feature string, labeled to be discarded, of the second target session is known, therefore, the feature string to be discarded with the largest transition entropy can be identified, and then the feature string to be discarded with the largest transition entropy is labeled as the first usable feature string, and is added to the first usable feature string of the second target session, and then the second target session adjusted through the feature string and each fifth session are taken as each sixth session.

Each second session saved locally is retriggered again in the client. For each second session, the network apparatus acquires each feature string in the data packet of the second session, and then matches each feature string in the data packet of the second session with each first usable feature string in the sixth session, takes the correspondingly matched first usable feature string as the fifth usable feature string, According to each fifth usable feature string, the network apparatus can determine each fifth field information corresponding to each fifth usable feature string, and takes each fifth field information corresponding to each fifth usable feature string as each fifth field information corresponding to each second session. Further, the network apparatus judges whether each fifth field information of the second session is correspondingly the same as the first field information contained in any sixth session, if so, the second session is blocked, otherwise, the second session is not blocked.

Then, the network apparatus counts the fifth quantity of the blocked second sessions, counts the blocked fifth data traffic, and further judges whether the first quantity is the same as the fifth quantity, and whether the first data traffic is the same as the fifth data traffic. If the first quantity is not the same as the fifth quantity, or if the first data traffic is not the same as the fifth data traffic, it indicates that the first usable feature string in the second target session adjusted through the feature string is valid in blocking the second session, therefore, each first usable feature string of the second target session adjusted through the feature string is determined to be valid. If the first quantity is the same as the fifth quantity, and the first data traffic is the same as the fifth data traffic, it indicates that the first usable feature string in the second target session adjusted by the feature string is still invalid in blocking the second session, at this time, each first usable feature string of the second target session adjusted through the feature string is determined to be invalid.

If each first usable feature string in the second target session adjusted through the feature string is determined to be invalid, the first usable feature string of the second target session is adjusted continuously, that is, the feature string to be discarded, with the largest transition entropy, of the first target session is continuously identified, and the feature string to be discarded with the largest transition entropy is labeled as the first usable feature string and added to the first usable feature string of the second target session adjusted through the feature string, and the validity of each first usable feature string of the second target session adjusted through the feature string is verified again, until the validity of each first usable feature string of the second target session adjusted through the feature string is determined.

After each first usable feature string of the second target session adjusted through the feature string is determined to be valid, each first usable feature string of the second target session adjusted through the feature string is adopted to update each first usable feature string of the original second target session. Afterwards, the other first session is taken as the second target session, and each remaining first session is taken as each fifth session, and the validity of the first usable feature string in the second target session is continuously verified. The verification process is the same as the above process, and will not be repeated redundantly herein.

In addition, if the feature strings to be discarded of the second target session are all labeled as the first usable feature strings, the first usable feature strings of the second target session are still judged to be invalid, at this time, the second target session and all its corresponding feature strings are filtered. In the process for verifying other first sessions, the feature strings corresponding to the filtered second target session are not considered.

FIG. 5 is a schematic diagram of a process for extracting a feature string provided in an embodiment of the present invention, and the process includes the following operations.

S501: taking any first session as a second target session, taking each remaining first session as each fifth session, identifying the feature string to be discarded, labeled to be the feature string to be discarded having the largest transition entropy, in the second target session, and labeling the feature string to be discarded having the largest transition entropy as the first usable feature string; and taking the second target session adjusted through the feature string and each fifth session as each sixth session.

S502: for each second session, acquiring each feature string in the data packet of the second session, taking the first usable feature string in the sixth session in corresponding match with the feature string as the fifth usable feature string, according to each fifth usable feature string, determining each fifth field information corresponding to the second session, judging whether each fifth field information of the second session is correspondingly the same as the first field information contained in any sixth session, if so, blocking the second session; counting the fifth quantity of the blocked second sessions, and the blocked fifth data traffic; judging whether the first quantity is the same as the fifth quantity, and whether the first data traffic is the same as the fifth data traffic; if not, determining the fifth usable feature string of the second target session adjusted through the feature string to be valid; if so, determining the fifth usable feature string of the second target session adjusted through the feature string to be invalid, and performing S501.

Since in the embodiment of the present invention, if the second quantity is smaller than the first quantity, each first session is taken as a second target session in sequence, each remaining first session is taken as each fifth session, and the validity of the first usable feature string in the second target session is verified. When the first usable feature string in the second target session is invalid, the feature string to be discarded, having the largest transition entropy, in the second target session is labeled as the first usable feature string, and the validity of the first usable feature string in the second target session is continuously verified, until each first usable feature string in the second target session adjusted through the feature string is determined to be valid, therefore, the adjusted first usable feature string can be ensured to effectively identify the session in the application.

In addition, for the condition that only one session is transmitted by the application, or only one key session is available, when the feature string is extracted in the related art, the application needs to be triggered repeatedly, and the session traffic is collected, and then repeated contrastive analysis is performed to extract the feature string. In the related art, for the condition that only one session is transmitted by the application, the ability in extracting the feature string is poor. In the method for extracting a feature string provided in the embodiment of the present invention, for the data packet in each first session, the feature string is extracted based on the first-order Markov transition probability matrix and the transition entropy, therefore, under the condition of not repeatedly triggering the application traffic, the ability in extracting a feature string for a single session is still favorable.

Embodiment 11

To ensure validity of the feature string extracted later, on the basis of each of the above embodiments, in the embodiments of the present invention, after the valid feature string is taken as a target feature string extracted from the data packet, the method further includes: saving the target feature string in an existing rule base.

After the target feature string is determined, the target feature string is saved in the existing rule base, when the feature string is extracted next time, then the first-order Markov transition probability matrix is calculated according to the latest rule base, and the subsequent steps for extracting a feature string are performed.

Specifically, when the target feature string is saved in the existing rule base, the target feature string corresponding to each first session is firstly determined according to each first session, and then for each first session, each field information corresponding to the target feature string of the first session is determined, and the target feature strings are combined according to each field information, to generate each application identification rule. Where, the target feature strings corresponding to the same field information are of an "or" relationship, and the target feature strings corresponding to different field information are of an "and" relationship. The combined target feature strings form each application identification rule, and each application identification rule can be saved in the existing rule base.

An example will be taken for illustration below.

For a certain first session, each field information corresponding to the target feature string of the first session is respectively k1, k2 and k3, the target feature strings corresponding to the field information a1 are m1 and m2, the target feature strings corresponding to the field information a2 are m3 and m4, and the target feature string corresponding to the field information a3 is m5. The target feature strings contained in each application identification rule formed after combination are respectively m1, m3 and m5;

m1, m4 and m5; m2, m3 and m5; m2, m4 and m5. The target feature strings are saved in the existing rule base in a combined form.

Embodiment 12

On the basis of each of the above embodiments, the embodiment of the present invention further provides a network apparatus, as shown in FIG. 6, the network apparatus includes: a processor 601, a communication interface 602, a memory 603, and a communication bus 604, where the processor 601, the communication interface 602 and the memory 603 communicate with each other through the communication bus 604.

The memory 603 stores computer programs, and when the programs are executed by the processor 601, the processor 601 is enabled to perform the following operations.

A1, counting each first session corresponding to each first five-tuple information according to each first five-tuple information corresponding to an application; for each first session, determining data packets having feature strings to be extracted in the first session, and determining particles of the data packets; and taking each determined particle as each candidate feature string.

B1, determining a first-order Markov transition probability matrix containing a transition probability of each two adjacent characters according to an existing rule base and a current genetic variation coefficient.

C1, for each candidate feature string, determining the transition probability of each two adjacent characters in the candidate feature string according to the first-order Markov transition probability matrix; and determining a transition entropy of the candidate feature string according to the transition probability of each two adjacent characters and a logarithm of the transition probability.

D1, for each candidate feature string, judging whether the transition entropy of the candidate feature string is greater than a preset threshold, if the transition entropy of the candidate feature string is not greater than the preset threshold, labeling the candidate feature string as a feature string to be discarded, if the transition entropy of the candidate feature string is greater than the preset threshold, labeling the candidate feature string as a first usable feature string.

E1, judging whether at least one first usable feature string exists as a valid feature string, if the at least one first usable feature string exists as the valid feature string, taking the valid feature string as a target feature string extracted from the data packets; if the at least one first usable feature string does not exist as the valid feature string, resetting the genetic variation coefficient, and performing B1.

Based on the same invention concept, the embodiment of the present invention further provides a network apparatus. Since the principles for solving problems by the network apparatus are similar to the principles of the method for extracting a feature string, therefore, for the implementation of the above network apparatus, please refer to the implementation of the method, and the repeated parts will not be repeated redundantly.

The network apparatus provided in the embodiment of the present invention can be specifically a desktop computer, a portable computer, a smartphone, a tablet computer, a personal digital assistant (PDA), and a network side device, etc.

The communication bus mentioned in the above network apparatus can be a peripheral component interconnect (PCI) bus or an extended industry standard architecture (EISA) bus. The communication bus can be divided into an address bus, a data bus, and a control bus, etc. To facilitate representation, only one thick line is used to represent, however, it does not represent that only one bus or one type of bus exists.

The communication interface 602 is used for communication between the above network apparatus and other devices.

The memory can include a random access memory (RAM), and can also include a non-volatile memory (NVM), for example at least one disk memory. Optionally, the memory can also be at least one storage device far away from the above processor.

The above processor can be a general-purpose processor, including a central processor, a network processor (NP), etc.; can also be a digital signal processor (DSP), an application-specific integrated circuit, a field programmable gate array or other programmable logic devices, a discrete gate or a transistor logic device, and a discrete hardware component, etc.

In the embodiments of the present invention, after each candidate feature string is determined, the transition entropy of the candidate feature string is determined according to the first-order Markov transition probability matrix containing a transition probability of each two adjacent characters, the candidate feature string having a transition entropy meeting a requirement is taken as a first usable feature string, and the valid first usable feature string is taken as an extracted target feature string. When no valid feature string exists, the genetic variation coefficient is reset, the first-order Markov transition probability matrix is redetermined according to the reset genetic variation coefficient, and then the target feature string is extracted. The method for extracting a feature string provided in the embodiment of the present invention does not require manual intervention, and achieves fully automatic extraction of a feature string.

Embodiment 12

On the basis of each of the above embodiments, the embodiment of the present invention further provides a computer readable storage medium, where the computer readable storage medium stores a computer program executable by a network apparatus, and when the program is running on the network apparatus, the network apparatus executes to realize the following operations.

A1, counting each first session corresponding to each first five-tuple information according to each first five-tuple information corresponding to an application; for the each first session, determining data packets having feature strings to be extracted in the first session, and determining particles of the data packets; and taking each determined participle as each candidate feature string.

B1, determining a first-order Markov transition probability matrix containing a transition probability of each two adjacent characters according to an existing rule base and a current genetic variation coefficient.

C1, for each candidate feature string, determining the transition probability of each two adjacent characters in the candidate feature string according to the first-order Markov transition probability matrix; and determining a transition entropy of the candidate feature string according to the transition probability of each two adjacent characters and a logarithm of the transition probability.

D1, for each candidate feature string, judging whether the transition entropy of the candidate feature string is greater than a preset threshold, if the transition entropy of the candidate feature string is not greater than the preset threshold, labeling the candidate feature string as a feature string to be discarded, if the transition entropy of the candidate feature string is greater than the preset threshold, labeling the candidate feature string as a first usable feature string.

E1, judging whether at least one first usable feature string exists as a valid feature string, if the at least one first usable feature string exists as the valid feature string, taking the valid feature string as a target feature string extracted from the data packets; if the at least one first usable feature string does not exist as the valid feature string, resetting the genetic variation coefficient, and performing B1.

Based on the same invention concept, the embodiment of the present invention further provides a computer readable storage medium. When the processor executes the computer program stored on the above computer readable storage medium, since the principles for solving problems are similar to the principles of the method for extracting a feature string, therefore, for the implementation of the processor in executing the computer program stored in the above computer readable storage medium, please refer to the implementation of the method, and the repeated parts will not be repeated redundantly.

The above computer readable storage medium can be any usable medium or data storage device accessible by the processor in the network apparatus, and includes but is not limited to a magnetic memory such as a floppy disk, a hard disk, a magnetic tape, a magnetic optical disk (MO), an optical memory such as CD, DVD, BD, HVD, and a semiconductor memory such as an ROM, an EPROM, an EEPROM, a non-volatile memory (NAND FLASH), and a solid state disk (SSD).

A computer program is stored in the computer readable storage medium provided in the embodiment of the present invention. When the computer program is executed by a processor, after each candidate feature string is determined, the transition entropy of the candidate feature string is determined according to the first-order Markov transition probability matrix containing a transition probability of each two adjacent characters, the candidate feature string having a transition entropy meeting a requirement is taken as a first usable feature string, and the valid first usable feature string is taken as an extracted target feature string. When no valid feature string exists, the genetic variation coefficient is reset, the first-order Markov transition probability matrix is redetermined according to the reset genetic variation coefficient, and then the target feature string is extracted. The method for extracting a feature string provided in the embodiment of the present invention does not require manual intervention, and achieves fully automatic extraction of a feature string.

Figure 7:
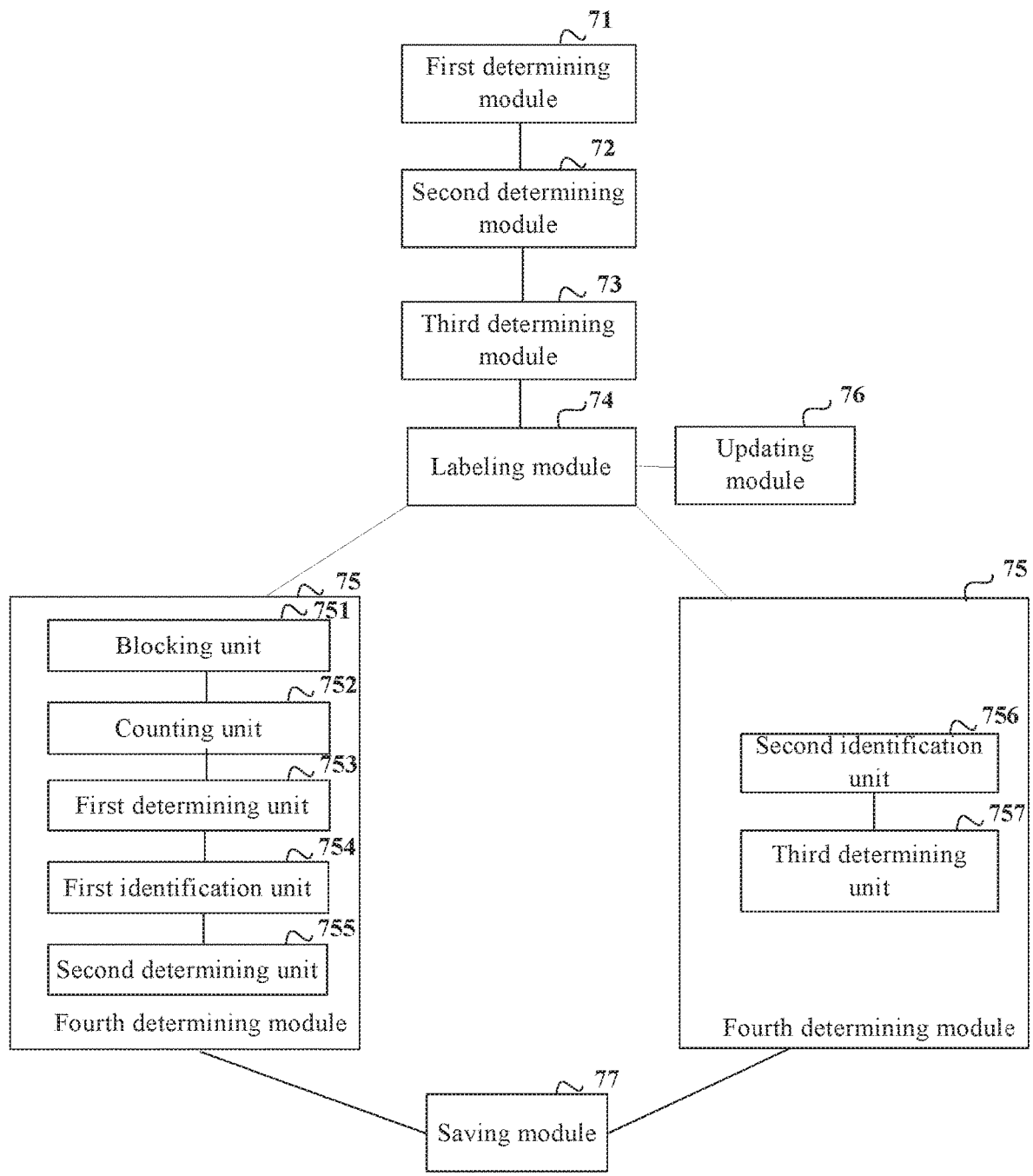
FIG. 7 is a structural schematic diagram of a device for extracting a feature string provided in an embodiment of the present invention.

FIG. 7 is a structural schematic diagram of a device for extracting a feature string provided in an embodiment of the present invention, and the device includes:

a first determining module 71, configured to count each first session corresponding to each first five-tuple information according to the each first five-tuple information corresponding to an application, for the each first session, determine data packets having feature strings to be extracted in the first session, and determine particiles of the data packets, and take each determined particle as each candidate feature string;

a second determining module 72, configured to determine a first-order Markov transition probability matrix containing a transition probability of each two adjacent characters according to an existing rule base and a current genetic variation coefficient;

a third determining module 73, configured to: for each candidate feature string, determine the transition probability of each two adjacent characters in the candidate feature string according to the first-order Markov transition probability matrix; and determine a transition entropy of the candidate feature string according to the transition probability of each two adjacent characters and a logarithm of the transition probability;

a labeling module 74, configured to, for each candidate feature string, judge whether the transition entropy of the candidate feature string is greater than a preset threshold, if the transition entropy of the candidate feature string is not greater than the preset threshold, label the candidate feature string as a feature string to be discarded, if the transition entropy of the candidate feature string is greater than the preset threshold, label the candidate feature string as a first usable feature string; and a fourth determining module 75, configured to judge whether at least one first usable feature string exists as a valid feature string, if the at least one first usable feature string exists as the valid feature string, take the valid feature string as a target feature string extracted from the data packet; if the at least one first usable feature string does not exist as the valid feature string, reset the genetic variation coefficient, and trigger the second determining module 72.

The third determining module 73 is specifically configured to calculate the product of the transition probability of each two adjacent characters and the logarithm of the transition probability, sum each obtained product, and determine the negative number of the obtained sum to be the transition entropy of the candidate feature string.

The first determining module 71 is specifically configured to, for each first session, acquire a preset quantity of data packets in the first session in a preset data packet transmission direction, and take the preset quantity of data packets as the data packets having feature strings to be extracted in the first session.

The first determining module 71 is specifically configured to, for the data packets having feature strings to be extracted, judge whether the data packets are hyper text transfer protocol (HTTP) data packets; if the data packets are the HTTP data packets, determine the particiles of the data packets according to a predefined regular expression, if the data packets are not the HTTP data packets, determine the particiles of the data packets according to an N-Gram language model.

The second determining module 72 is specifically configured to read an existing rule base, for each two adjacent characters in the existing rule base, count the number of occurrence of the two adjacent characters, and count the number of occurrence of the previous character in the two adjacent characters among the characters, except the last character, in the existing rule base, and determine the transition probability of the two adjacent characters according to the ratio of the number of occurrence of the two adjacent characters to the number of occurrence of the previous character in the two adjacent characters; and determine the first-order Markov transition probability matrix containing a transition probability of each two adjacent characters according to the transition probability of the two adjacent characters and the current genetic variation coefficient.

The device further includes: an updating module 76, configured to recombine in sequence the characters contained in the candidate feature string from front to back, to constitute multiple sub-candidate feature strings; for each sub-candidate feature string, determine the transition probability of two adjacent characters in the sub-candidate feature string according to the first-order Markov transition probability matrix, and determine an entropy wave value of the sub-candidate feature string according to the transition probability of the character group constituted by each two adjacent characters in the sub-candidate feature string, the logarithm of the transition probability, and the quantity of character groups contained in the sub-candidate feature string; for the candidate feature string, identify the target sub-candidate feature string having the largest entropy wave value in the candidate feature string, determine the redundancy of the candidate feature string according to the ratio of the entropy wave value of the target sub-candidate feature string to the transition entropy of the candidate feature string; judge whether the redundancy of the candidate feature string is greater than a preset redundancy threshold, if the redundancy of the candidate feature string is not greater than the preset redundancy threshold, keep the candidate character string unchanged; if the redundancy of the candidate feature string is greater than the preset redundancy threshold, update the candidate feature string by adopting the target sub-candidate feature string.

The updating module 76 is specifically configured to calculate the product of the transition probability of the character group constituted by each two adjacent characters in the sub-candidate feature string and the logarithm of the transition probability, sum each obtained product, determine the ratio of the obtained sum to the quantity of character groups contained in the sub-candidate feature string, and take the negative number of the ratio as an entropy wave value of the sub-candidate feature string.

The fourth determining module 75 is specifically configured to, for each first session, determine each first field information corresponding to each first usable feature string of the first session, count each second session corresponding to each second five-tuple information according to each second five-tuple information corresponding to the application; for each second session, acquire each feature string in data packets of the second session, take the first usable feature string in the first session in corresponding match with the feature string as a second usable feature string, according to each second usable feature string, determine each second field information corresponding to the second session, judge whether each second field information of the second session is correspondingly the same as the first field information contained in any first session, if the each second field information of the second session is correspondingly the same as the first field information contained in any first session, block the second session; and count the first quantity of the blocked second sessions, and the total second quantity of the second sessions transmitted by the application; and judge whether the first quantity is the same as the second quantity, if the first quantity is the same as the second quantity, judge each first usable feature string to be the valid feature string.

The fourth determining module 75 is further configured to count the blocked first data traffic and the total second data traffic transmitted by the application; judge whether the ratio of the first data traffic to the second data traffic is greater than a preset first threshold; and/or judge whether the ratio of the first quantity to the second quantity is greater than a preset second threshold; if the ratio of the first data traffic to the second data traffic is greater than the preset first threshold and/or the radio of the first quantity to the second quantity is greater than the preset second threshold, judge each first usable feature string to be the valid feature string.

The fourth determining module 75 includes:

a blocking unit 751, configured to take each first session as a first target session in sequence, and take each remaining first session as each third session, for each second session, acquire each feature string in the data packet of the second session, take the first usable feature string in the third session in corresponding match with the feature string as a third usable feature string, according to each third usable feature string, determine each third field information corresponding to the second session, and judge whether each third field information of the second session is correspondingly the same as the first field information contained in any third session, if the each third field information of the second session is correspondingly the same as the first field information contained in any third session, block the second session;

a counting unit 752, configured to count a third quantity of the blocked second sessions, and blocked third data traffic;

a first determining unit 753, configured to judge whether the first quantity is the same as the third quantity, and whether the first data traffic is the same as the third data traffic; if the first quantity is different from the third quantity and/or the first data traffic is different from the third data traffic, determine each first usable feature string of the first target session to be valid; if the first quantity is the same as the third quantity, and the first data traffic is the same as the third data traffic, determine each first usable feature string of the first target session to be invalid, and trigger the first identification unit 754;

a first identification unit 754, configured to identify the first usable feature string having the smallest transition entropy in the first target session, and label the first usable feature string having the smallest transition entropy as a feature string to be discarded; and take the first target session adjusted through the feature string and each third session as each fourth session; and a second determining unit 755, configured to: for each second session, acquire each feature string in the data packets of the second session, take the first usable feature string in the fourth session in corresponding match with the feature string as a fourth usable feature string, according to each fourth usable feature string, determine each fourth field information corresponding to the second session, and judge whether each fourth field information of the second session is correspondingly the same as the first field information contained in any fourth session, if the each fourth field information of the second session is correspondingly the same as the first field information contained in any fourth session, block the second session; count the fourth quantity of the blocked second sessions, and the blocked fourth data traffic; judge whether the first quantity is the same as the fourth quantity, and whether the first data traffic is the same as the fourth data traffic; if the first quantity is different from the fourth quantity, and/or the first data traffic is different from the fourth data traffic, determine the first usable feature string of the first target session adjusted through the feature string to be valid; if the first quantity is the same as the fourth quantity, and the first data traffic is the same as the fourth data traffic, determine the first usable feature string of the first target session adjusted through the feature string to be invalid, and trigger the first identification unit 754.

The fourth determining module further includes: a second identification unit 756, configured to take any first session as a second target session, take each remaining first session as each fifth session, identify the feature string to be discarded, labeled to be the feature string to be discarded having the largest transition entropy, in the second target session, and label the feature string to be discarded having the largest transition entropy as the first usable feature string; and take the second target session adjusted through the feature string and each fifth session as each sixth session; and a third determining unit 757, configured to: for each second session, acquire each feature string in the data packet of the second session, take the first usable feature string in the sixth session in corresponding match with the feature string as the fifth usable feature string, according to each fifth usable feature string, determine each fifth field information corresponding to the second session, judge whether each fifth field information of the second session is correspondingly the same as the first field information contained in any sixth session, if so, block the second session; count the fifth quantity of the blocked second sessions, and the blocked fifth data traffic; judge whether the first quantity is the same as the fifth quantity, and whether the first data traffic is the same as the fifth data traffic; if not, determine the fifth usable feature string of the second target session adjusted through the feature string to be valid; if so, determine the fifth usable feature string of the second target session adjusted through the feature string to be invalid, and trigger the second identification unit 756.

The device further includes: a saving module 77, configured to save the target feature string in the existing rule base.

Embodiments of the present invention provide a method for extracting a feature string, a device, a network apparatus and a storage medium. The method includes: A1, counting each first session corresponding to each first five-tuple information according to each first five-tuple information corresponding to an application; for each first session, determining a data packet having a feature string to be extracted in the first session, and determining the participle of the data packet; and taking each determined participle as each candidate feature string; B1, determining a first-order Markov transition probability matrix containing a transition probability of each two adjacent characters according to an existing rule base and a current genetic variation coefficient; C1, for each candidate feature string, determining a transition probability of each two adjacent characters in the candidate feature string according to the first-order Markov transition probability matrix; and determining a transition entropy of the candidate feature string according to the transition probability of each two adjacent characters and a logarithm of the transition probability: D1, for each candidate feature string, judging whether the transition entropy of the candidate feature string is greater than a preset threshold, if not, then labeling the candidate feature string as a feature string to be discarded, if so, labeling the candidate feature string as a first usable feature string; and E1, judging whether at least one first usable feature string exists as a valid feature string, if so, taking the valid feature string as a target feature string extracted from the data packet; if not, resetting the genetic variation coefficient, and performing step B1.

Since in the embodiments of the present invention, after each candidate feature string is determined, according to the first-order Markov transition probability matrix containing a transition probability of each two adjacent characters, the transition entropy of the candidate feature string is determined, the candidate feature string having a transition entropy meeting a requirement is labeled as a first usable feature string, and the valid first usable feature string is taken as an extracted target feature string. When no valid feature string exits, the genetic variation coefficient is reset, the first-order Markov transition probability matrix is redetermined according to the reset genetic variation coefficient, and then the target feature string is extracted. The method for extracting a feature string provided in the embodiments of the present invention does not require manual intervention, and achieves fully automatic extraction of a feature string.

The present invention has been described in a flow chart and/or a block diagram of the method, the device (system) and the computer program product according to the embodiments of the present invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine, so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing devices to operate in a specific manner, so that the instructions stored in the computer readable memory create an article of manufacture including instruction means, and such instruction means perform the functions specified in the flow(s) of the flow chart and/or the block(s) of the block diagram.

These computer program instructions can also be loaded onto the computer or the other programmable data processing devices, such that a series of operational steps are performed on the computer or the other programmable data processing devices to produce computer-implemented processing, then the instructions executed on the computer or the other programmable devices provide steps for realizing the functions specified in the flow(s) of the flow chart and/or the block(s) of the block diagram.

Although the preferred embodiments of the present invention have been described, however, those skilled in the art can make additional variations and modifications to these embodiments once they learn about the concept of basic creativity. Therefore, the appended claims are interpreted to encompass preferred embodiments and all the variations and modifications falling within the scope of the present invention.

Evidently those skilled in the art can make various modifications and variations to the present invention without departing from the spirit and scope of the present invention. In this way, the present invention is also intended to encompass these modifications and variations thereto so long as the modifications and variations come into the scope of the claims appended to the present invention and their equivalents.

The invention claimed is:

1. A method for extracting a feature string, comprising:
A1, according to each first five-tuple information corresponding to an application, counting each first session corresponding to the each first five-tuple information; for the each first session, determining data packets having feature strings to be extracted in the first session, and determining participles of the data packets; and taking each determined participle as each candidate feature string;
B1, determining a first-order Markov transition probability matrix containing a transition probability of each two adjacent characters according to an existing rule base and a current genetic variation coefficient;

C1, for the each candidate feature string, determining the transition probability of each two adjacent characters in the candidate feature string according to the first-order Markov transition probability matrix; and determining a transition entropy of the candidate feature string according to the transition probability of each two adjacent characters and a logarithm of the transition probability;

D1, for the each candidate feature string, judging whether the transition entropy of the candidate feature string is greater than a preset threshold, when the transition entropy of the candidate feature string is not greater than the preset threshold, labeling the candidate feature string as a feature string to be discarded, when the transition entropy of the candidate feature string is greater than the preset threshold, labeling the candidate feature string as a first usable feature string; and E1, judging whether at least one first usable feature string exists as a valid feature string, when the at least one first usable feature string exists as the valid feature string, taking the valid feature string as a target feature string extracted from the data packets; when the at least one first usable feature string does not exist as the valid feature string, resetting the genetic variation coefficient, and performing B1.

2. The method according to claim 1, wherein the determining the transition entropy of the candidate feature string according to the transition probability of each two adjacent characters and the logarithm of the transition probability comprises:

calculating the product of the transition probability of each two adjacent characters and the logarithm of the transition probability, summing each obtained product, and determining a negative number of the obtained sum to be the transition entropy of the candidate feature string.

3. The method according to claim 1, wherein for the each first session, determining the data packets having feature strings to be extracted in the first session comprises:

for the each first session, acquiring a preset quantity of data packets in the first session in a preset data packet transmission direction; and taking the preset quantity of data packets as the data packets having feature strings to be extracted in the first session.

4. The method according to claim 1, wherein for the data packets having feature strings to be extracted, determining the participles of the data packets comprises:

for the data packets having feature strings to be extracted, judging whether the data packets are hyper text transfer protocol (HTTP) data packets;

when the data packets are the HTTP data packets, determining the participles of the data packets according to a predefined regular expression; and when the data packets are not the HTTP data packets, determining the participles of the data packets according to an N-Gram language model.

5. The method according to claim 1, wherein the determining the first-order Markov transition probability matrix containing the transition probability of each two adjacent characters according to the existing rule base and the current genetic variation coefficient comprises:

reading an existing rule base;

for each two adjacent characters in the existing rule base, counting a quantity of occurrence of the two adjacent characters;

counting a quantity of occurrence of a previous character in the two adjacent characters among the characters, except a last character, in the existing rule base;

determining the transition probability of the two adjacent characters according to a ratio of the quantity of occurrence of the two adjacent characters to the quantity of occurrence of the previous character in the two adjacent characters; and determining the first-order Markov transition probability matrix containing the transition probability of each two adjacent characters according to the transition probability of the two adjacent characters and the current genetic variation coefficient.

6. The method according to claim 1, wherein before labeling the candidate feature string as the first usable feature string, the method further comprises:

recombining in sequence characters contained in the candidate feature string from front to back, to constitute multiple sub-candidate feature strings;

for each sub-candidate feature string, determining the transition probability of each two adjacent characters in the sub-candidate feature string according to the first-order Markov transition probability matrix, and determining an entropy wave value of the sub-candidate feature string according to the transition probability of a character group constituted by each two adjacent characters in the sub-candidate feature string, the logarithm of the transition probability, and a quantity of character groups contained in the sub-candidate feature string; and for the candidate feature string, identifying a target sub-candidate feature string having a largest entropy wave value in the candidate feature string, determining a redundancy of the candidate feature string according to a ratio of an entropy wave value of the target sub-candidate feature string to the transition entropy of the candidate feature string; judging whether the redundancy of the candidate feature string is greater than a preset redundancy threshold, when the redundancy of the candidate feature string is not greater than the preset redundancy threshold, keeping the candidate character string unchanged; when the redundancy of the candidate feature string is greater than the preset redundancy threshold, updating the candidate feature string by adopting the target sub-candidate feature string.

7. The method according to claim 6, wherein the determining the entropy wave value of the sub-candidate feature string according to the transition probability of the character group constituted by each two adjacent characters in the sub-candidate feature string, the logarithm of the transition probability, and the quantity of character groups contained in the sub-candidate feature string comprises:

calculating the product of the transition probability of the character group constituted by each two adjacent characters in the sub-candidate feature string and the logarithm of the transition probability, summing each obtained product, and determining a ratio of the obtained sum to the quantity of character groups contained in the sub-candidate feature string, and taking a negative number of the ratio as the entropy wave value of the sub-candidate feature string.

8. The method according to claim 1, wherein the judging whether at least one first usable feature string exists as the valid feature string comprises:

for the each first session, determining each first field information corresponding to each first usable feature string of the first session;

counting each second session corresponding to each second five-tuple information according to each second five-tuple information corresponding to the application;

for the each second session, acquiring each feature string in data packets of the second session, and taking the first usable feature string in the first session in corresponding match with the feature string as a second usable feature string; according to each second usable feature string, determining each second field information corresponding to the second session; and judging whether each second field information of the second session is correspondingly the same as the first field information contained in any first session, when the each second field information of the second session is correspondingly the same as the first field information contained in any first session, blocking the second session; and counting a first quantity of blocked second sessions, and a total second quantity of second sessions transmitted by the application; and judging whether the first quantity is the same as the second quantity, when the first quantity is the same as the second quantity, judging each first usable feature string to be the valid feature string.

9. The method according to claim 8, wherein when the second quantity is determined to be greater than the first quantity, the method further comprises:

counting a blocked first data traffic and a total second data traffic transmitted by the application; and judging whether a ratio of the first data traffic to the second data traffic is greater than a preset first threshold; and/or judging whether a ratio of the first quantity to the second quantity is greater than a preset second threshold; when the ratio of the first data traffic to the second data traffic is greater than the preset first threshold and/or the ratio of the first quantity to the second quantity is greater than the preset second threshold, judging each first usable feature string to be the valid feature string.

10. The method according to claim 9, wherein when the ratio of the first data traffic to the second data traffic is not greater than the preset first threshold; or when the ratio of the first quantity to the second quantity is not greater than the preset second threshold, the method further comprises:

taking the each first session as a first target session in sequence, and taking each remaining first session as each third session, to perform following operations:

A2, for the each second session, acquiring each feature string in the data packets of the second session, taking the first usable feature string in the third session in corresponding match with the feature string as a third usable feature string; according to each third usable feature string, determining each third field information corresponding to the second session; and judging whether the each third field information of the second session is correspondingly the same as the first field information contained in any third session, when the each third field information of the second session is correspondingly the same as the first field information contained in any third session, blocking the second session;

B2, counting a third quantity of blocked second sessions, and a blocked third data traffic;

C2, judging whether the first quantity is the same as the third quantity, and whether the first data traffic is the same as the third data traffic; when the first quantity is different from the third quantity and/or the first data traffic is different from the third data traffic, determining each first usable feature string of the first target session to be valid; when the first quantity is the same as the third quantity, and the first data traffic is the same as the third data traffic, determining each first usable feature string of the first target session to be invalid, and performing D2;

D2, identifying a first usable feature string having a smallest transition entropy in the first target session, and labeling the first usable feature string having the smallest transition entropy as a feature string to be discarded; and taking the first target session adjusted through the feature string and each third session as each fourth session; and E2, for each second session, acquiring each feature string in the data packets of the second session, taking the first usable feature string in the fourth session in corresponding match with the feature string as a fourth usable feature string; according to each fourth usable feature string, determining each fourth field information corresponding to the second session; judging whether the each fourth field information of the second session is correspondingly the same as the first field information contained in any fourth session, when the each fourth field information of the second session is correspondingly the same as the first field information contained in any fourth session, blocking the second session; counting a fourth quantity of blocked second sessions, and a blocked fourth data traffic; judging whether the first quantity is the same as the fourth quantity, and whether the first data traffic is the same as the fourth data traffic; when the first quantity is different from the fourth quantity, and/or the first data traffic is different from the fourth data traffic, determining the first usable feature string of the first target session adjusted through the feature string to be valid; when the first quantity is the same as the fourth quantity, and the first data traffic is the same as the fourth data traffic, determining the first usable feature string of the first target session adjusted through the feature string to be invalid, and performing D2.

11. The method according to claim 8, wherein when the second quantity is determined to be smaller than the first quantity, the method further comprises:

A3, taking any first session as a second target session, taking each remaining first session as each fifth session, identifying a feature string to be discarded, labeled to be the feature string to be discarded having a largest transition entropy, in the second target session, and labeling the feature string to be discarded having the largest transition entropy as the first usable feature string; and taking the second target session adjusted through the feature string and each fifth session as each sixth session; and B3, for the each second session, acquiring each feature string in the data packets of the second session, taking the first usable feature string in the sixth session in corresponding match with the feature string as the fifth usable feature string; according to each fifth usable feature string, determining each fifth field information corresponding to the second session; judging whether the each fifth field information of the second session is correspondingly the same as the first field information contained in any sixth session, when the each fifth field information of the second session is correspondingly the same as the first field information contained in any sixth session, blocking the second session; counting a fifth quantity of blocked second sessions, and a blocked fifth data traffic; judging whether the first quantity is the same as the fifth quantity, and whether the first data traffic is the same as the fifth data traffic; when the first quantity is different from the fifth quantity, and/or the first data traffic is different from the fifth data traffic, determining the fifth usable feature string of the second target session adjusted through the feature string to be valid; when the first quantity is the same as the fifth quantity, and the first data traffic is the same as the fifth data traffic, determining the fifth usable feature string of the second target session adjusted through the feature string to be invalid, and performing A3.

12. A device for extracting a feature string, comprising: a processor and a memory, wherein the processor is configured to read and execute computer programs stored on the memory to:

count each first session corresponding to each first five-tuple information according to the each first five-tuple information corresponding to an application, for the each first session, determine data packets having feature strings to be extracted in the first session, and determine participles of the data packets, and take each determined participle as each candidate feature string;

determine a first-order Markov transition probability matrix containing a transition probability of each two adjacent characters according to an existing rule base and a current genetic variation coefficient;

for the each candidate feature string, determine the transition probability of each two adjacent characters in the candidate feature string according to the first-order Markov transition probability matrix; and determine a transition entropy of the candidate feature string according to the transition probability of each two adjacent characters and a logarithm of the transition probability;

for the each candidate feature string, judge whether the transition entropy of the candidate feature string is greater than a preset threshold, when the transition entropy of the candidate feature string is not greater than the preset threshold, label the candidate feature string as a feature string to be discarded, when the transition entropy of the candidate feature string is greater than the preset threshold, label the candidate feature string as a first usable feature string; and judge whether at least one first usable feature string exists as a valid feature string, when the at least one first usable feature string exists as the valid feature string, take the valid feature string as a target feature string extracted from the data packet; when the at least one first usable feature string does not exist as the valid feature string, reset the genetic variation coefficient, and trigger operations of: determining the first-order Markov transition probability matrix containing the transition probability of each two adjacent characters according to the existing rule base and the current genetic variation coefficient.

13. The device according to claim 12, wherein the processor is further configured to read and execute computer programs stored on the memory to calculate the product of the transition probability of each two adjacent characters and the logarithm of the transition probability, sum each obtained product, and determine a negative number of the obtained sum to be the transition entropy of the candidate feature string.

14. The device according to claim 12, wherein the processor is further configured to read and execute computer programs stored on the memory to, for the each first session, acquire a preset quantity of data packets in the first session in a preset data packet transmission direction, and take the preset quantity of data packets as the data packets having feature strings to be extracted in the first session.

15. The device according to claim 12, wherein the processor is further configured to read and execute computer programs stored on the memory to, for the data packets having feature strings to be extracted, judge whether the data packets are hyper text transfer protocol (HTTP) data packets; when the data packets are the HTTP data packets, determine the participles of the data packets according to a predefined regular expression, when the data packets are not the HTTP data packets, determine the participles of the data packets according to an N-Gram language model.

16. The device according to claim 12, wherein the processor is further configured to read and execute computer programs stored on the memory to read an existing rule base, for each two adjacent characters in the existing rule base, count a quantity of occurrence of the two adjacent characters; count a quantity of occurrence of a previous character in the two adjacent characters among the characters, except a last character, in the existing rule base; determine the transition probability of the two adjacent characters according to a ratio of the quantity of occurrence of the two adjacent characters to the quantity of occurrence of the previous character in the two adjacent characters; and determine the first-order Markov transition probability matrix containing the transition probability of each two adjacent characters according to the transition probability of the two adjacent characters and the current genetic variation coefficient.

17. The device according to claim 12, wherein the processor is further configured to read and execute computer programs stored on the memory to:

recombine in sequence characters contained in the candidate feature string from front to back, to constitute multiple sub-candidate feature strings;

for each sub-candidate feature string, determine the transition probability of each two adjacent characters in the sub-candidate feature string according to the first-order Markov transition probability matrix, and determine an entropy wave value of the sub-candidate feature string according to the transition probability of a character group constituted by each two adjacent characters in the sub-candidate feature string, the logarithm of the transition probability, and a quantity of character groups contained in the sub-candidate feature string; and for the candidate feature string, identify a target sub-candidate feature string having a largest entropy wave value in the candidate feature string, determine a redundancy of the candidate feature string according to a ratio of an entropy wave value of the target sub-candidate feature string to the transition entropy of the candidate feature string; judge whether the redundancy of the candidate feature string is greater than a preset redundancy threshold, when the redundancy of the candidate feature string is not greater than the preset redundancy threshold, keep the candidate character string unchanged; when the redundancy of the candidate feature string is greater than the preset redundancy threshold, update the candidate feature string by adopting the target sub-candidate feature string;

wherein the processor is further configured to read and execute computer programs stored on the memory to:
calculate the product of the transition probability of the character group constituted by each two adjacent characters in the sub-candidate feature string and the logarithm of the transition probability, sum each obtained product, determine a ratio of the obtained sum to the quantity of character groups contained in the sub-candidate feature string, and take a negative number of the ratio as the entropy wave value of the sub-candidate feature string.

18. The device according to claim 12, wherein the processor is further configured to read and execute computer programs stored on the memory to:
for the each first session, determine each first field information corresponding to each first usable feature string of the first session;
count each second session corresponding to each second five-tuple information according to each second five-tuple information corresponding to the application;
for the each second session, acquire each feature string in data packets of the second session, and take the first usable feature string in the first session in corresponding match with the feature string as a second usable feature string; according to each second usable feature string, determine each second field information corresponding to the second session; and judge whether each second field information of the second session is correspondingly the same as the first field information contained in any first session, when the each second field information of the second session is correspondingly the same as the first field information contained in any first session, block the second session; and
count a first quantity of blocked second sessions, and a total second quantity of second sessions transmitted by the application; and judge whether the first quantity is the same as the second quantity, when the first quantity is the same as the second quantity, judge each first usable feature string to be the valid feature string;
wherein the processor is further configured to read and execute computer programs stored on the memory to:
count a blocked first data traffic and a total second data traffic transmitted by the application; judge whether a ratio of the first data traffic to the second data traffic is greater than a preset first threshold; and/or judge whether a ratio of the first quantity to the second quantity is greater than a preset second threshold; when the ratio of the first data traffic to the second data traffic is greater than the preset first threshold and/or the radio of the first quantity to the second quantity is greater than the preset second threshold, judge each first usable feature string to be the valid feature string.

19. The device according to claim 18, wherein the processor is further configured to read and execute computer programs stored on the memory to:
take the each first session as a first target session in sequence, and take each remaining first session as each third session, for the each second session, acquire each feature string in the data packets of the second session, take the first usable feature string in the third session in corresponding match with the feature string as a third usable feature string; according to each third usable feature string, determine each third field information corresponding to the second session; and judge whether the each third field information of the second session is correspondingly the same as the first field information contained in any third session, when the each third field information of the second session is correspondingly the same as the first field information contained in any third session, block the second session;
count a third quantity of blocked second sessions, and a blocked third data traffic;
judge whether the first quantity is the same as the third quantity, and whether the first data traffic is the same as the third data traffic; when the first quantity is different from the third quantity and/or the first data traffic is different from the third data traffic, determine each first usable feature string of the first target session to be valid; when the first quantity is the same as the third quantity, and the first data traffic is the same as the third data traffic, determine each first usable feature string of the first target session to be invalid;
identify a first usable feature string having a smallest transition entropy in the first target session, and label the first usable feature string having the smallest transition entropy as a feature string to be discarded; and take the first target session adjusted through the feature string and each third session as each fourth session; and
for each second session, acquire each feature string in the data packets of the second session, take the first usable feature string in the fourth session in corresponding match with the feature string as a fourth usable feature string; according to each fourth usable feature string, determine each fourth field information corresponding to the second session; and judge whether the each fourth field information of the second session is correspondingly the same as the first field information contained in any fourth session, when the each fourth field information of the second session is correspondingly the same as the first field information contained in any fourth session, block the second session; count a fourth quantity of blocked second sessions, and a blocked fourth data traffic; judge whether the first quantity is the same as the fourth quantity, and whether the first data traffic is the same as the fourth data traffic; when the first quantity is different from the fourth quantity, and/or the first data traffic is different from the fourth data traffic, determine the first usable feature string of the first target session adjusted through the feature string to be valid; when the first quantity is the same as the fourth quantity, and the first data traffic is the same as the fourth data traffic, determine the first usable feature string of the first target session adjusted through the feature string to be invalid, and trigger operations of: identifying the first usable feature string having the smallest transition entropy in the first target session, labeling the first usable feature string having the smallest transition entropy as the feature string to be discarded, and taking the first target session adjusted through the feature string and each third session as each fourth session.

20. The device according to claim 18, wherein the processor is further configured to read and execute computer programs stored on the memory to:
take any first session as a second target session, take each remaining first session as each fifth session, identify a feature string to be discarded, labeled to be the feature string to be discarded having a largest transition entropy, in the second target session, and label the feature string to be discarded having the largest transition entropy as the first usable feature string; and take the second target session adjusted through the feature string and each fifth session as each sixth session; and for the each second session, acquire each feature string in the data packets of the second session, take the first usable feature string in the sixth session in corresponding match with the feature string as the fifth usable feature string; according to each fifth usable feature string, determine each fifth field information corresponding to the second session; judge whether the each fifth field information of the second session is correspondingly the same as the first field information contained in any sixth session, when the each fifth field information of the second session is correspondingly the same as the first field information contained in any sixth session, block the second session; count a fifth quantity of blocked second sessions, and a blocked fifth data traffic; judge whether the first quantity is the same as the fifth quantity, and whether the first data traffic is the same as the fifth data traffic; when the first quantity is different from the fifth quantity, and/or the first data traffic is different from the fifth data traffic, determine the fifth usable feature string of the second target session adjusted through the feature string to be valid; when the first quantity is the same as the fifth quantity, and the first data traffic is the same as the fifth data traffic, determine the fifth usable feature string of the second target session adjusted through the feature string to be invalid, and trigger operations of: taking any first session as the second target session, taking each remaining first session as each fifth session, identifying the feature string to be discarded, labeled to be the feature string to be discarded having the largest transition entropy, in the second target session, labeling the feature string to be discarded having the largest transition entropy as the first usable feature string, and taking the second target session adjusted through the feature string and each fifth session as each sixth session.

\* \* \* \* \*